United States Patent [19]

Wiedeman et al.

[11] Patent Number: 5,594,780
[45] Date of Patent: *Jan. 14, 1997

[54] SATELLITE COMMUNICATION SYSTEM THAT IS COUPLED TO A TERRESTRIAL COMMUNICATION NETWORK AND METHOD

[75] Inventors: Robert A. Wiedeman, Los Altos; Paul A. Monte, San Jose, both of Calif.

[73] Assignee: Space Systems/Loral, Inc., Palo Alto, Calif.

[*] Notice: The term of this patent shall not extend beyond the expiration date of Pat. No. 5,448,623.

[21] Appl. No.: 459,105

[22] Filed: Jun. 2, 1995

Related U.S. Application Data

[63] Continuation of Ser. No. 407,799, Mar. 20, 1995, Pat. No. 5,448,623, which is a continuation of Ser. No. 88,896, Jul. 8, 1993, abandoned, which is a continuation-in-part of Ser. No. 775,625, Oct. 10, 1991, abandoned.

[51] Int. Cl.$^6$ ........................................... H04Q 7/38
[52] U.S. Cl. .............................. 379/59; 379/57; 370/316; 370/331
[58] Field of Search ..................... 370/104.1, 18; 379/59, 60; 244/158 R; 342/353, 354, 371, 373; 375/99, 102, 200; 455/10, 11.1, 12.1, 12.2, 13.1, 13.2, 33.1, 33.2, 33.4, 56.1, 65, 68, 52.3, 70, 303

[56] References Cited

U.S. PATENT DOCUMENTS

| | | | |
|---|---|---|---|
| Re. 32,905 | 4/1989 | Baran | 370/104 |
| 4,424,417 | 1/1984 | Chavey et al. | 179/2 E |

(List continued on next page.)

FOREIGN PATENT DOCUMENTS

| | | |
|---|---|---|
| 0421698A2 | 4/1991 | European Pat. Off. . |
| 1-175420A | 7/1989 | Japan . |
| WO90/13186 | 11/1990 | WIPO . |
| WO91/09473 | 6/1991 | WIPO . |

OTHER PUBLICATIONS

Lovell, Knouse, Weber, "An Experiment to Enable Commercial Mobile Satellite Service", The National Telesystems Conference.
American Online, Business Wire.
American Online, "Commissions Launches Investigations into Global Mobile Satellite Systems", European Commission Press Release.

(List continued on next page.)

*Primary Examiner*—William Cumming
*Attorney, Agent, or Firm*—Perman & Green

[57] ABSTRACT

A wireless telephone system (10) capable of servicing a roaming wireless telephone user (30) includes a satellite (22) communications system consisting of at least one orbiting satellite (22); at least one terrestrial-based gateway (12, 14, 16, 18) having access to a database (20) of users, destination codes (telephone numbers); at least one network coordinating gateway (28) within at least one satellite service area (24); a single network control center (25); and a plurality of terrestrial communications links (e.g. 101). The system (10) operates by effecting communication between a terrestrial wireless telephone end user transceiver apparatus (e.g. 501) and a terrestrial communications link (e.g. 101) via a single relay through a single satellite (22) or a succession of single relay satellites (22) wherein the relay station may be in motion relative to the end user transceiver apparatus (501) and the terrestrial communications link (101). The ground-based gateway (28) effects the ultimate decision on linking in cooperation with the network database to effect hand-off from a first orbiting satellite (22) to a second orbiting satellite (22). The single satellite (22) or preferably a constellation of satellites (22) orbiting near the earth need only translate signals from the gateways (12, 14, 16, 18) to the users (30) and from the users (30) to the gateways (12, 14, 16, 18), without satellite-based control. The gateways (12, 14, 16, 18) are capable of decoding the calls, switching, processing call requests from the end users (30), processing call requests to the end users (30), processing call set-ups, handing off of calls to other satellites (22), and updating databases (20) of users (30) based on information provided by network control (25) and requests from end users (30).

20 Claims, 20 Drawing Sheets

U.S. PATENT DOCUMENTS

| | | | |
|---|---|---|---|
| 4,672,655 | 6/1987 | Koch | 379/57 |
| 4,672,656 | 6/1987 | Pfeiffer et al. | 379/58 |
| 4,833,701 | 5/1989 | Comroe et al. | |
| 4,901,340 | 2/1990 | Parker et al. | |
| 4,972,456 | 11/1990 | Kaczmarek et al. | |
| 4,972,460 | 11/1990 | Sasuta | |
| 4,979,170 | 12/1990 | Gilhousen et al. | 370/104.1 |
| 5,008,952 | 4/1991 | Davis et al. | 455/12 |
| 5,010,317 | 4/1991 | Schwendeman et al. | 340/311.1 |
| 5,073,900 | 12/1991 | Mallinckrodt | 375/1 |
| 5,081,703 | 1/1992 | Lee | 455/13.1 |
| 5,101,500 | 3/1992 | Marui | 455/33 |
| 5,109,390 | 4/1992 | Gilhousen et al. | 375/1 |
| 5,119,225 | 6/1992 | Grant et al. | 359/172 |
| 5,122,795 | 6/1992 | Cubley et al. | 340/825.44 |
| 5,216,427 | 6/1993 | Yan et al. | 342/352 |
| 5,233,626 | 8/1993 | Ames | 375/1 |
| 5,239,671 | 8/1993 | Linquist et al. | 455/13.1 |
| 5,303,286 | 4/1994 | Wiedeman | 379/59 |
| 5,339,330 | 8/1994 | Mallinckrodt | 375/1 |
| 5,410,728 | 4/1995 | Bertiger et al. | 455/13.1 |
| 5,415,368 | 5/1995 | Horstein et al. | 244/158 R |
| 5,422,647 | 6/1995 | Hirshfield et al. | 342/354 |
| 5,433,726 | 7/1995 | Horstein et al. | 244/158 R |
| 5,439,190 | 8/1995 | Horstein et al. | 244/158 R |
| 5,446,756 | 8/1995 | Mallinckrodt | 375/200 |
| 5,448,623 | 9/1995 | Wiedeman et al. | 379/59 |

OTHER PUBLICATIONS

Iridium—Miscellaneous materials related to public announcement 25 Jun. 1990 (Motorola, Inc.).

Application of Ellipsat Corp. to FCC. Nov. 2, 1990.

"Software Implementation of a PN Spread Spectrum Receiver to Accommodate Dynamics", C. Cahn et al., IEEE Trans. on Communications, vol. COM-25, No. 8, Aug. 1988, pp. 832–840.

"A Communications Technique for Multipath Channels", R. Price et al., Proceedings of the IR, Mar. 1958.

"Increased Capacity Using CDMA for Mobile Satellite Communication", K. Gilhousen et al., IEEE Journal on Selected Areas in Communications, vol. 8, No. 4, May 1990, pp. 503–514.

Petition of American Mobile Satellite Corporation Before the FCC, Washington, DC 20554, dated Jun. 3, 1991, pp. 1–15.

Application of Motorola Satellite Communications, Inc. for Iridium A Low Earth Orbit Mobile Satellite System before the FCC, Washington, D.C. Dec. 1990, pp. 49–96.

Before the FCC, Washington, D.C. 20554, Aries Constellation Low Earth Orbit Satellite System Proposal on Constellation Communications, Inc. Jun. 3, 1991, Appendix A, B, and C.

Application of TRW Inc. for Authority to Construct a New Communications Satellite System Outset before the ECC, Washington, D.C. 20554, May 31, 1991 pp. 33–51.

"The Iridium™ System—A Revolutionary Satellite Communications System Developed With Innovative Applications of Technology", D. Sterling et al., IEEE Nov. 4–7, 1991.

"Iridium*: Key to Worldwide Cellular Communications", Telecommunications, Oct., 1991, pp. 23–28.

Globalstar System Application —Parts I–IV, Application of Loral Cellular Systems, Corp. before the Federal Communications Commission, Washington, D.C., Jun. 3, 1991.

"Satellite Communication Systems Engineering", W. Pritchard et al., 1993 Prentice–Hall, Inc. pp. 399–406.

Binder et al., "Crosslink architectures for a multiple satellite system", Proceedings of the IEEE, vol. 75, No. 1, Jan. 1987, pp. 74–81.

K. Brayer, "Packet Switching for mobile earth stations via low–orbit satellite network", Proceedings of the IEEE, right-–hand col., lines 3–5, p. 1628, left–hand col., lines 309, p. 1629, left–hand col., lines 18–29, FIG..1, vol. 72, No. 1, Jan. 1987.

Robert A. Lovell, George H. Knouse, and William J. Weber, "An Experiment to Enable Commercial Mobile Satellite Service", *IEEE National Telesystems Conference*, Nov. 7–10, 1982, pp. B1.3.1–B1.3.5.

Enrico Del Re, "An Integrated Satellite–Cellular Land Mobile System for Europe", *University of Florence, Department of Electronics Engineering*, Italy, Sep. 21, 1989.

Peter Dondl, "Digital Network Oriented Mobile Radio Satellite System As An Integrated Part of the GSM Cellular Radio System in Europe", *Deutsch Bundespost/Fernmeldetechnisches Zentralamt/Darmstadt*, Fed. Rep. of Germany, Sep. 21, 1989.

Edward G. Tiedmann, Jr., Irwin M. Jacobs, Allen B. Salmasi, and Thomas J. Bernard, "The OmniTRaCS Mobile Satellite Communications and Positioning System", *Vehicle Electronics in the 90's: Proceedings of the International Congress on Transportation Electronics, Society of Automotive Engineers, Inc.*, Oct. 1990, pp. 503–507.

Shuzo Kato, Shingo Ohmori and Yutaka Yasuda, "Current and Future Mobile Satellite Communication Systems", *IEICE Transactions*, vol. E 74, No. 8, Aug. 1991, pp. 2201–2210.

5,594,780

SATELLITE COMMUNICATION SYSTEM THAT IS COUPLED TO A TERRESTRIAL COMMUNICATION NETWORK AND METHOD

This is a continuation of application Ser. No. 08/407,799, filed on Mar. 20, 1995, now U.S. Pat. No. 5,448,623, which is a continuation of U.S. Ser. No. 08/088,896, filed Jul. 8, 1993, abandoned, which is a continuation-in-part of U.S. Ser. No. 07/775,625, filed Oct. 10, 1991, abandoned.

CROSS-REFERENCE TO RELATED APPLICATION

U.S. patent application Ser. No. 07/678,931 filed Mar. 29, 1991 in the name of one of the co-inventors describes a cellular telephone system wherein orbiting satellites contain controllers for switching and controlling call set-up, in conjunction with a ground-based database management system. The present invention provides an alternate solution.

BACKGROUND OF THE INVENTION

This invention relates to a wireless telephone system for employing one or a plurality of orbiting satellites to allow wireless telephone users (subscribers) communication access to a terrestrial telephone system (whether private, government or common carrier), and particularly to a wireless telephone system, such as a cellular system, which permits subscriber access to terrestrial telephone networks while the subscriber is roaming in areas that do not have cellular telephone services.

There is a need to provide personal communications anywhere on the earth. Current communications systems, for example, cellular telephone systems, require terrestrial cellular relay stations to intercept and link a cellular radiotelephone transmission with conventional switched telephone users and with other cellular telephone users. All of the existing communications systems have limited user range.

Cellular telephone systems have been proposed which account for roamers, i.e., cellular telephone users which roam outside a normal service area. The American Telephone and Telegraph Corp. (AT&T) has proposed an inter-cellular data network for interconnecting terrestrial cellular telephone service areas using a terrestrial packet-switched network that has nodes at the participating cellular telephone service areas wherein packet-switched network data are accumulated in a database of roaming cellular telephone users. The database therein proposed would keep track of roamers and allow terrestrial interconnection of the roamer to the telephone system when the roamer is located in a cellular telephone service area that is remote from a designated home cell. Certain data are collected which would allow routing of calls to the roaming user, allow issuance of billing information, and allow collection of other system operation data.

Efforts are under way to utilize satellite technology in cellular communications. Satellite delivered telephone services to mobile users have been proposed as the Mobile Satellite System (MSS) in the USA. This system is now being implemented by the American Mobile Satellite Corp. (AMSC). It utilizes transceivers in the mobile unit (automobile for example) operating in the L-band (1530–1560 MHz and 1646.5–1660.5 MHz) that communicate to a satellite at geosynchronous orbit. This system is limited to serving just a small portion of the earth. In addition to significant expense to the end user for the transceiver apparatus, the system is subject to noticeable relay delay due to transmission of the signals to and from geosynchronous orbit. Furthermore, the cellular telephone service providers must nevertheless implement a costly additional inter-system network to direct calls to the mobile transceiver apparatus. The current system as envisaged does not have a method for locating the roaming user and directing the call to the user.

U.S. Pat. No. 4,972,456, assigned to GTE MobileNet, discloses a cellular telephone "satellite" roaming system that uses a satellite system to permit access to the cellular telephone system when a user is located in areas outside of cellular telephone system coverage. This system does not contemplate overhead orbiting satellites, but rather the system would employ subsidiary cell sites in a terrestrial-based cellular communications system.

Other patents relate to general information on cellular telephone roaming systems which permit a user of one cellular system to use another cellular system while traveling in areas outside a home cellular system. These patents include U.S. Pat. Nos. 4,901,340; 4,972,460; and 4,833,701.

Motorola, Inc. announced on Jun. 27, 1990 a proposed crosslinked satellite network under the name IRIDIUM. The IRIDIUM system is believed to be described in European Patent Publication EP 365,885, published May 2, 1990, and corresponding to U.S. patent application Ser. No. 263,849 filed 28 Oct. 1988. The IRIDIUM system envisions a constellation of seventy-seven low-earth orbiting satellites in seven circular polar orbits for supporting cellular telephone communications on the earth's surface. In the IRIDIUM system, all handoff and relays of communications traffic are handled in space directly between satellites, so that the terrestrial telephone network is bypassed. However, ground signal processing is required to set up and place calls. Calls originating from outside the satellite service areas must interrogate the home location of the user in order to identify the user. The system requires that all satellites be linked constantly to one another. Each of eleven evenly-spaced satellites sharing an orbit plane is contemplated to project thirty-seven communications cells on the earth's surface. Additionally, each satellite has four intersatellite links, thus forming a geodesic sphere for traffic communication paths. Due to cost and channel limitation, it may be presumed that the IRIDIUM system will not compete with the services provided by terrestrial-based cellular communications systems. A technical description of this invention is believed to be contained under U.S. patent application Ser. No. 263,849 filed Oct. 28, 1988 in the names of Bertiger, Leopold and Peterson.

By a document dated Nov. 2, 1990, Ellipsat Corporation made application to the Federal Communications Commission for authority to construct an elliptical orbit satellite system to support, among other things, mobile voice services in the United States through a constellation of six satellites. The service has been presented as complementary of and not competitive with existing and future (terrestrial) cellular telephone services. The system contemplates the use by end users of dual-mode transceivers using Code Division Multiple Access (CDMA) modulation to effect communications with earth satellites in extended-coverage elliptical orbit.

DISCLOSURE OF INVENTION

According to the invention, a radio communication system capable of servicing a roaming user or the like outside the range of terrestrial relay stations includes a packet-switched network and database of all users, a satellite communications system having at least one but usually a plurality of orbiting satellites over a terrestrial satellite service area, a satellite control center, a single network control center, at least one Network Coordinating Gateway (NCG) but usually a plurality spread over a large geographic area, gateways with a home user database and a roamer database and a plurality of terrestrial communications links, wherein call setup is controlled by processors and databases at the NCG(s) and control and switching rely on ground-based equipment at the gateways such that the orbiting satellites are integrated into a ground-based telephone network and tariff structure. The system operates by effecting communication between a terrestrial wireless telephone end user transceiver apparatus and a terrestrial communications link via only a single relay (comprising a forward link and a reverse link) through a single satellite or a succession of relays through other orbiting satellites wherein the relay station (satellite) is in motion relative to the end user transceiver apparatus and to the terrestrial communications link, wherein the ground-based equipment makes the ultimate decision on linking based on satellite ephemeris information and end user information, and wherein the end user transceiver apparatus, the orbiting satellite and the terrestrial communications link cooperate to effect hand-off from a first orbiting satellite to a second orbiting satellite other than the first orbiting satellite. The NCG(s) are capable of receiving requests for and assigning satellite resources on an autonomous basis. The satellites are simple relay stations which receive, translate in frequency, amplify, and transmit signals. The satellites do not do "onboard" processing, which implies demodulating the signal to bits, manipulating the bits, and remodulating. The waveform goes through the satellite unchanged. Also, there are no direct satellite-to-satellite communication paths in the present invention.

The present invention offers substantial advantages while integrating with existing telephone systems. The invention allows wireless telephone with automatic switching (cellular) voice, data and facsimile communication to the public-switched telephone network in areas not served by terrestrial cellular telephone systems. The invention in particular provides enhanced roaming cellular telephone services to cellular telephone service areas that have poor coverage, gaps in coverage, and other service area degradation. As a consequence, there is also an increased ability to provide emergency communications services, such as reporting of medical emergencies, roadside breakdowns, tracking of stolen cars and other similar services in all areas served by satellite.

The invention will be better understood by reference to the following detailed description in connection with the accompanying drawings.

DETAILED DESCRIPTION OF THE PREFERRED EMBODIMENTS

Figure 1:
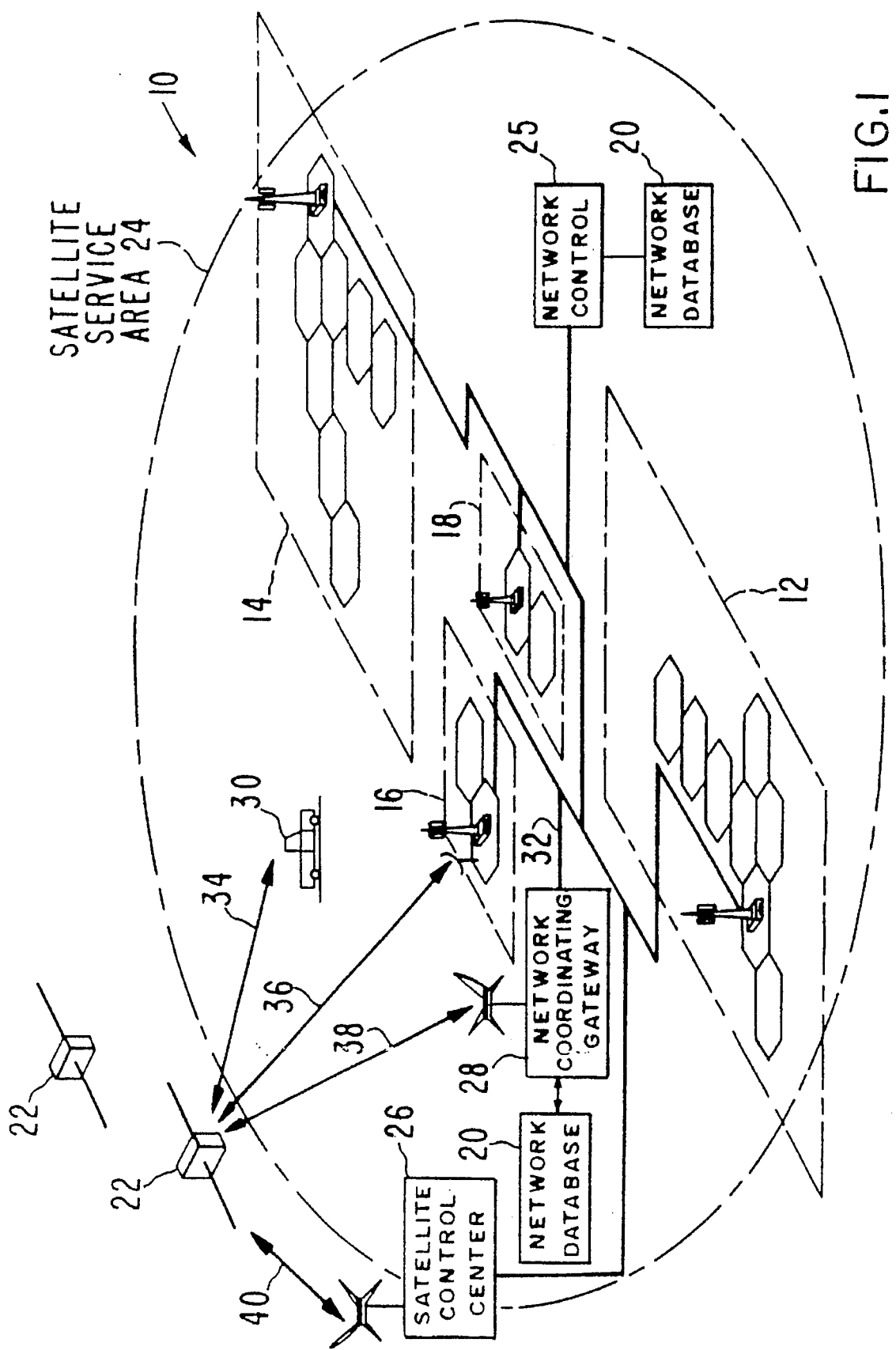
FIG. 1 is a figurative illustration of an integrated wireless telephone and orbiting satellite communications system in accordance with the invention.

An integrated wireless/satellite communications system 10 according to the invention is shown in FIG. 1. The system 10 may include private, government or cellular telephone systems which themselves comprise gateways 12, 14, 16, 18, each having the means to communicate with the satellite system 10. The gateways may be conventionally-defined metropolitan service areas (MSAs) 12, 14, 16 and rural service areas (RSAs) 18, government telecommunications gateways, or private network nodes. The system 10 may further include according to the invention a network database 20 of users, a satellite communications system with a single one or a plurality of low-earth orbit satellites 22, each of which services a (moving) satellite service area 24, a network control 25, a satellite control center 26, at least one network coordinating gateway 28, a representative roaming end user 30, a packet switched network 32, and a plurality of satellite communications links, including for example satellite telephone communications links 34, 36, a network communications link 38, and a satellite control link 40.

This detailed description uses a cellular terrestrial communications system as an example. As stated above, the invention may alternatively be used with private or government communications systems which may be slightly different than the example given here. In government systems, the communication links may be encrypted. In government and private systems, the ground nodes may be connected only to a private network.

In the exemplary cellular telephone system, there are contemplated existing and future terrestrial wireless telephone systems. Herein they may be collectively referred to as a Terrestrial Service Areas (TSAs).

In accordance with the invention, there is provided a Satellite Service Area (SSA) 24 (which may be moving) having a communications link 34 capable of servicing any roaming user 30 within the SSA 24. The satellite control center 26 is to provide for proper operation of the satellite system 22 by means of Satellite Control Links (SCL) 40 to and from a plurality of satellites which are passing overhead. Other links include the Network Coordinating Link (NCL) 38, the satellite-to-user link 34, and the satellite-to-gateway link 36.

The TSAs are linked by a nationwide packet switched network (NWN) 32 which may be used to establish the network database 20 of users. The NWN 32 may provide the service areas with information necessary to locate roaming users, log in users, log out users, allocate satellite resources, and set up calls.

The satellite system 22 may comprise a single satellite or a constellation of many satellites preferably in low-earth near circular or possibly elliptical orbits. Each satellite is provided with a communications subsystem which is capable of receiving uplink signals, converting them to downlink frequencies, amplifying the signals, and transmitting the signals back to the earth. The satellites do not incorporate satellite-to-satellite links nor serve as bypass to ground-based telecommunications facilities. The satellites are simple "bent-pipe" repeaters, do not perform any on-board signal processing of the communications traffic, and do not have regenerative repeaters. By on-board signal processing (a term commonly used in the satellite industry), it is meant that the satellite brings the RF signals down to bits, and further that the satellite switches or otherwise manipulates the signals. The lack of on-board signal processing of the communications traffic is in sharp contrast to the prior art where on-board signal processing is performed, e.g., U.S. Pat. No. 5,073,900 to Mallinckrodt (col. 4 lines 35–39) and European patent publication 0 365 885 to Bertiger (col. 4 lines 7–9). As used herein, "communications traffic" means the voice, data, or other messages that are passed from the user 30 to the caller 107, 108, 50, and vice versa. "Communications traffic" does not include control signals that are sent from the earth to the satellite 22. A regenerative repeater is defined in Sklar, B., *Digital Communications* (Prentice Hall 1988), p. 232 as one which demodulates and reconstitutes the digital information embedded in the received waveforms before retransmission. A regenerative repeater is defined in Pritchard, W. L. et al., *Satellite Communication Systems Engineering* (Prentice Hall 2d ed. 1993), p. 401 as follows: ". . . a regenerative repeater, utilizes onboard signal processing of digital signals. . ."

The satellite control link 40 provides remote control of satellite components and configurations. The network coordinating link 38 provides for data transfer to and from a network coordinating gateway 28 for the purpose of establishing communications to and from a roaming user 30, for logging on to the system (registration). The wireless telephone links 34, 36 are used for voice and data communications, position location and other services between the user and various wireless telephone systems. The network control center 25 is used to coordinate between NCGs 28, keep the network database 20 updated to all NCGs 28, collect billing and system information, and coordinate any information from the satellite control center 26 that the NCG(s) 28 might require, such as satellite ephemeris and health.

The wireless telephone user equipment preferably may be any commercially available unit that has the capability of digital signal generation and a compatible modulation scheme with the network into which it is to be integrated, combined with digital and frequency generating equipment compatible with the satellite system. Code Division Multiple Access (CDMA) modulation or other modulation compatible with the satellite relay system is contemplated.

SYSTEM OPERATION

Operation of the system according to the invention is first described in connection with FIG. 2 and FIG. 3 as follows:

Notification is a first procedure. Each user has a home gateway (HG). Each gateway 12, 14, 16 has a home user database 31 which contains information of all the users for which that gateway is home. Each gateway 12, 14, 16 has a roamer database 27 of all the active roamers in the gateway's service area. The roaming user 30 notifies the system, either by a special control signal to the present satellite system 22 as shown in FIG. 2, by a relay path A-C to a network coordinating gateway (NCG) 28, or, if in service area range, by a special control signal to the nearest service area terrestrial base station 38, that the user 30 desires to use the satellite communications system. The control signal is repeated by all satellites 22 in view of the user 30 to any NCG(s) 28 in view of the satellite(s) 22. The NCGs 28 have algorithms (such as closest to user) to choose between or among NCGs 28. An NCG 28 is selected and takes the request. The special control signal is processed by the NCG 28 and routed outward from the NCG 28 to the packet switched network 32. The NCG 28 selects an Active Gateway (AG) 16, which will handle all calls to and from the user 30 by a system selected method (such as gateway closest to user, or special gateway by request of user). The NCG 28 sends a message to AG 16. The network database 20 is updated to include the user 30 as a roamer in the satellite service area 24. The NCG 28 notes the acceptability of the user 30, and the network database 20 is updated to show the user 30 roaming in the SSA 24. The roamer database 27 of active gateway 16 is then updated to show the user 30 to be in the Satellite Service Area (SSA) 24. The user's home gateway database is updated to show that the user 30 is being serviced by active gateway 16. This condition exists until the user 30 re-enters a service area of the terrestrial cellular system or until the user 30 enters a different satellite service area 24.

There are two kinds of telephone calls: incoming (inbound) to the satellite system and the terrestrial network from the (roaming) user 30; and outgoing (outbound) to the user from the satellite system and the terrestrial network.

Incoming calls initiated by the user 30 begin with a request to access the public switched telephone network (PSTN). The AG 16 processes the request and checks its databases 27, 31 for the user 30. Depending on ephemeris, satellite resources, gateway resources and call destination, the call is accepted by the AG 16. If necessary, the AG 16 requests satellite resources from an NCG 28. The AG 16 could be a user's HG or any remote TSA. The call is set up, for example as shown in FIG. 2, via path A-B, under database control of the designated NCG 28 and the selected TSA 16. The remote TSA 16 (the AG) then acknowledges the request and processes the call to the call destination 50 through a public switched circuit 17. Channels and/or codes are assigned by the AG 16 assisted by the designated NCG 28; and the gateway roamer database 27 at the AG 16 is updated to show that the user equipment is busy. A handoff processor 33 at the AG 16 is updated to enable handoff from one satellite to another if required. The AG 16 notifies the designated NCG 28, via the packet switched network 32, that the call is in process and states the satellite resources that are being used, to allow the NCG 28 to note in its database 20 that the user 30 is busy. The home user database 31 of the user's HG is updated to show the user 30 as busy and to show the user's AG 16.

Figure 2:
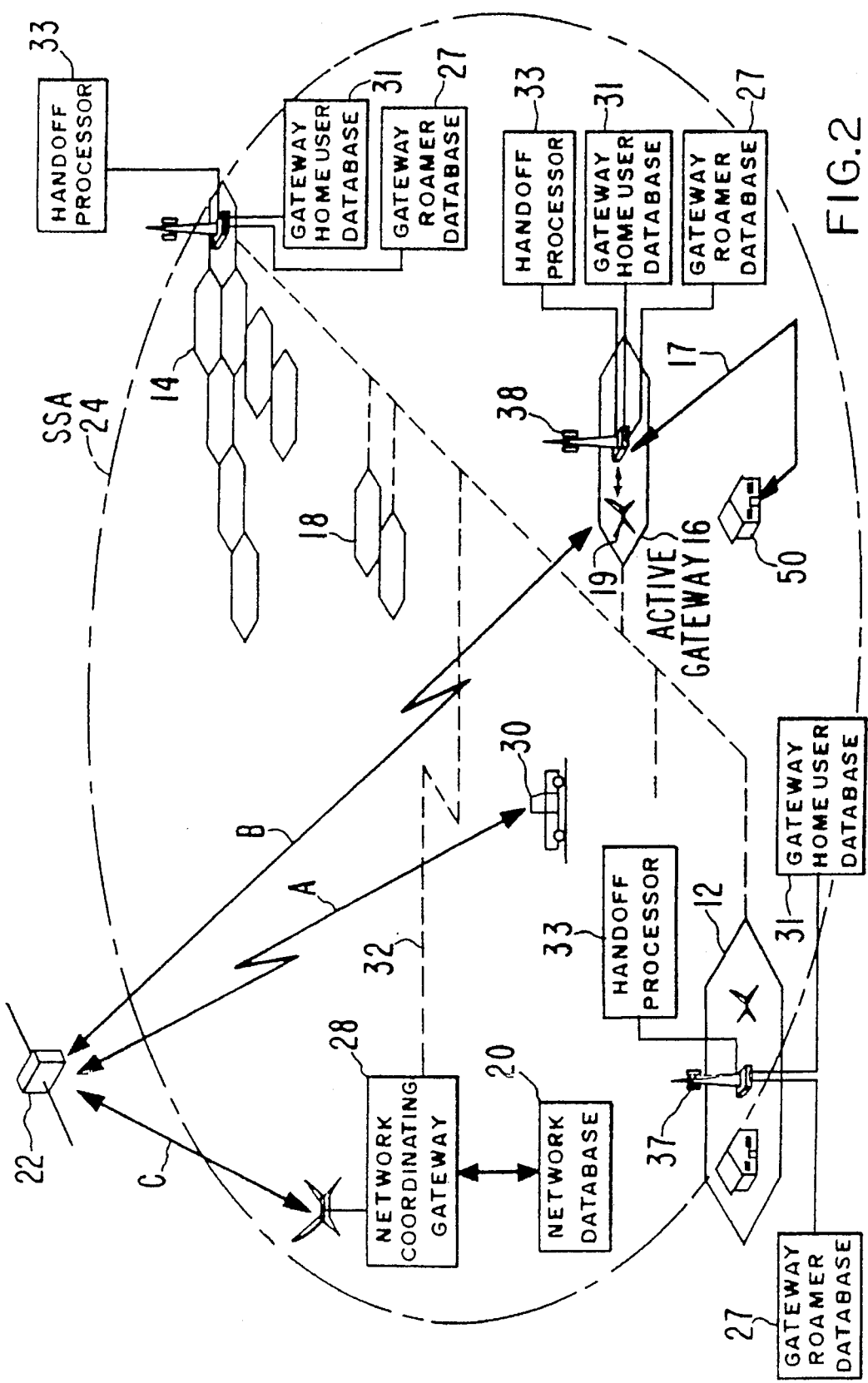
FIG. 2 is a figurative illustration of the integrated wireless telephone and orbiting satellite communications system showing how a first type of duplex communications circuit may be set up.

Subsequent to call setup, the user 30 and the call destination 50 are connected via two-way wireless (cellular) telephone communications links A-B, as shown in FIG. 2. These communications may be carried out using spread spectrum modulation techniques and Code Division Multiple Access (CDMA) channels, or other modulation compatible with the satellite system, using equipment located at the user 30 position, and equipment located at the remote TSA 16 in the satellite service area (SSA) 24. The CDMA or other modulation signal is converted to a voice signal at both the user 30 end and the remote TSA 16. At the user 30 end, the signal is converted either to an analog signal for voice and sent to a loudspeaker or headphones, or converted to a digital signal and sent to another device for further processing of data. At the remote TSA end 16 the signal is received by antenna 38, converted to either a voice signal or digital data, and sent via a PSTN switch (not shown) for further routing via the public switched telephone network 17 to the call destination 50. After communications is ended, a signal from either end 30, 50 of an "on-hook" condition signifies end of communication.

The call termination processes proceed as follows: the AG 16 notifies the designated NCG 28 of call termination and that the channel is free. The network database 20 is notified of call termination and billing information, and is updated to show the user 30 as not busy. The AG 16 updates its roamer database 27 and resets handoff processor 33. The AG 16 notifies the user's HG via packet network 32 that the user 30 is not busy. The HG updates its home user database 31 to show user 30 not busy.

Consider the situation where a remote location called the "caller" 50 desires to make a telephone call to a cellular telephone user 30 that is roaming and is not located in a terrestrial cellular telephone service area (TCTSA). The call is initiated as shown in FIG. 3. The caller 50 uses the PSTN 21 to call the user's wireless (cellular) telephone number at the user's HG 12 or perhaps some other equivalent location. The call is transferred by the PSTN switch to the user's HG 12. The HG 12 equipment 23 processes the call and, by accessing the home user database 31, finds that the user 30 is roaming in the satellite service area 24 and thereby knows to route the call to the AG, which, for this example, we assume is the same as HG 12. The HG equipment 23 then routes a request for route planning to the route planner 25. The route planner 25 routes the call to the AG 12. In this example, the AG 12 is the HG 12, so no more call routing is required. The home TSA 12 makes a cell setup notification to the designated NCG 28 via packet network 32. The AG 12, upon receiving the request signal, checks its database 31 for user status, processes the information, and based on the information in its database 31, satellite resources and AG 12 resources, accepts or rejects the call.

If the AG 12 is another GTSA (not the user's HG), such as equipment 16, HG 12 requests a call setup to the AG 16 via the packet network 32. The AG 16 checks satellite 22 channel capacity and requests satellite 22 resources from the designated NCG 28 if necessary via the packet network 32. The AG 16 hails the user 30 and transmits call setup information via the satellite 22. The ACG 16 notifies the HG 12 to route the call to the AG 16 and to update its home user database 31 to show the user 30 is busy. The call setup is as described above for the home TSA 12.

If it accepts a call for connection, the AG 12, 16 sets up the call. The AG 12, 16 transmits the request for access to the user 30 through satellite 22. If accepted by the user 30, an acknowledgment is transmitted to the AG 12, 16 through satellite 22. The AG 12, 16 updates the database 31 to show the user 30 to be busy, and signals the designated NCG 28 to update the network database 20 to show the user 30 to be busy.

Figure 3:
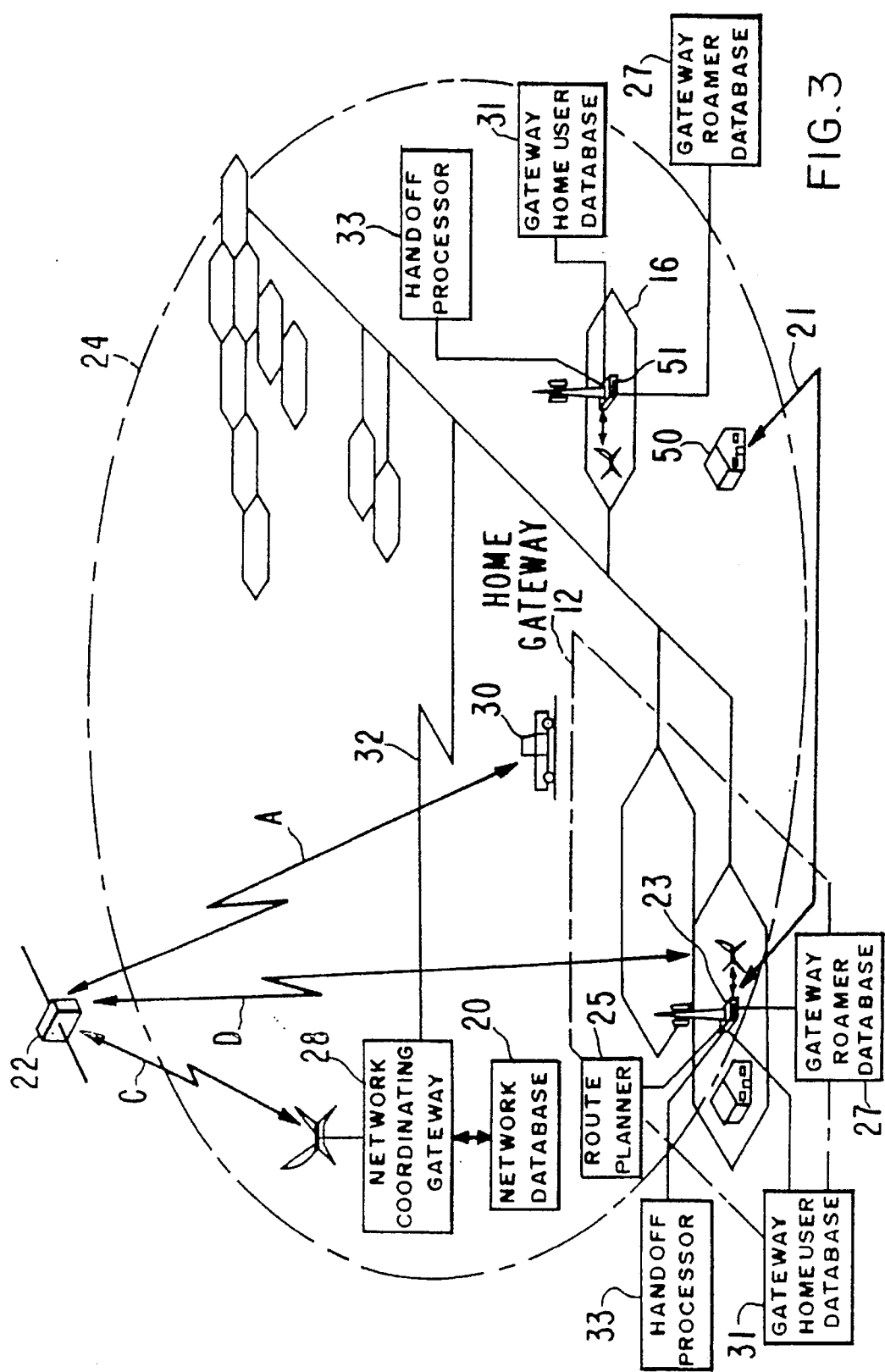
FIG. 3 is a figurative illustration of the integrated wireless telephone and orbiting satellite communications system showing how a second type of duplex communications circuit may be set up.

Subsequent to call setup, the user 30 and the caller 50 are connected via two-way wireless telephone communications links via path A-D, as shown in FIG. 3. The AG 12, 16 notifies the designated NCG 28 that the call is in progress and states the satellite resources that are being used. The designated NCG 28 updates the network database 20. The AG 12, 16 notifies the HG 12 that the call is in progress. The HG 12 updates its home user database 31 to show the user 30 busy. As before, the communications are carried out over Code Division Multiple Access (CDMA), or other compatible modulation, channels using equipment located at the user 30 position, and equipment located at the remote TSA 12 in the satellite service area 24. After communications are ended, a signal from either end of an "on-hook" condition signifies end of communication.

The user 30 at some point may decide to either terminate roaming in the SSA 24 or may re-enter a terrestrial cellular service area. If the user 30 desires to terminate roaming in the SSA 24, he has two options: First, the user 30 may put his equipment on standby, thereby causing his equipment to not respond. This has the effect of temporarily making the user 30 unavailable for taking outbound calls to him. Alternatively, the user 30 may remove his identifying codes from the network database 20 of SSA 24 roamers. To effect the removal from the database 20, the user 30 must notify the AG 12, 16, typically via satellite 22, of intent to discontinue roaming in the SSA 24. The AG 12, 16 receives the user 30 intention, updates its roamer (or home user) database 27, 31 by deleting the user 30, and notifies the designated NCG 28 to update the network database 20 to show the user 30 as not roaming in the SSA 24. The AG 12, 16 notifies the HG 12 to update its home user database 31 to show that the user 30 is no longer roaming in the SSA 24.

Figure 4:
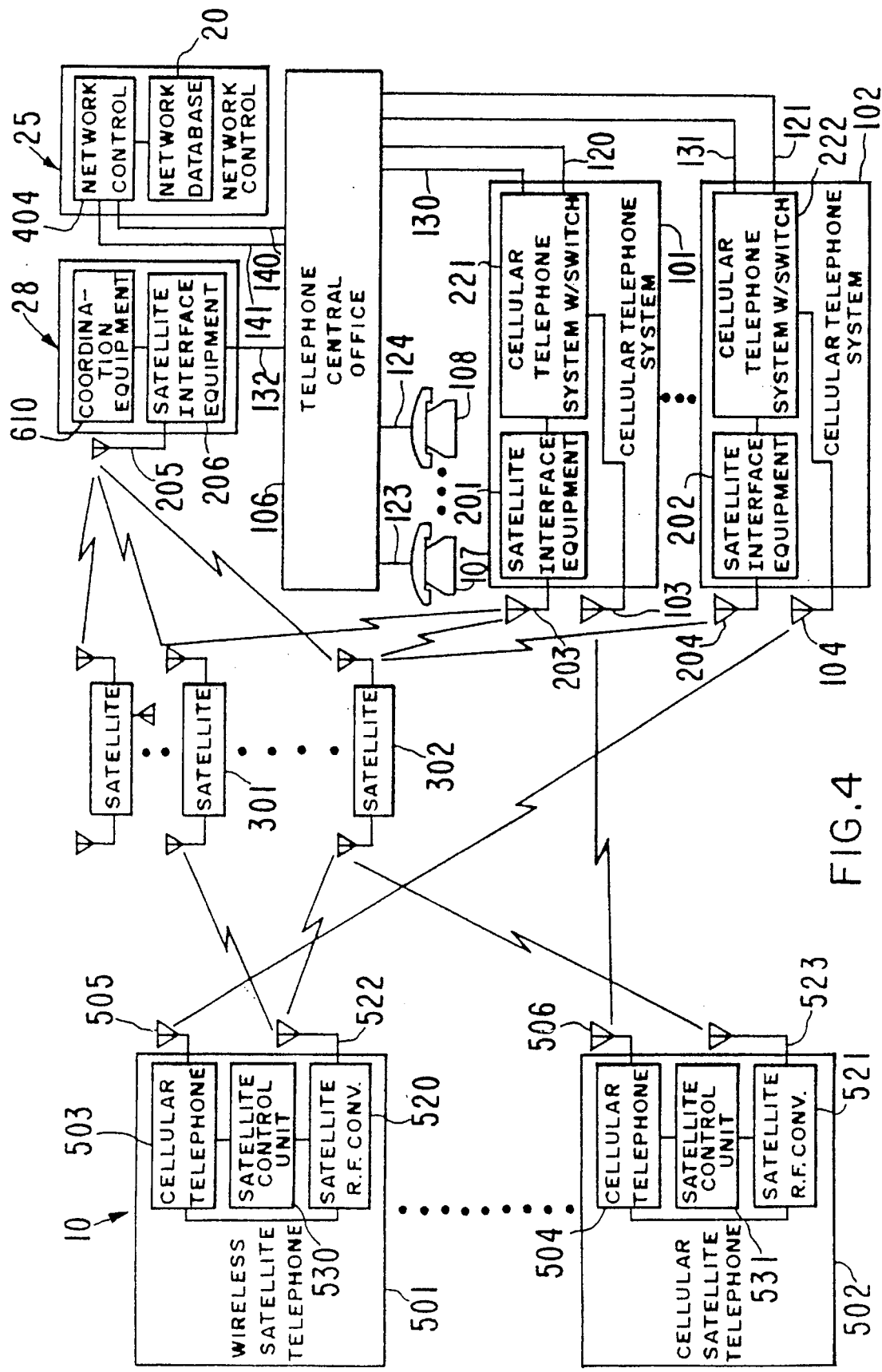
FIG. 4 is a system block diagram according to the invention.

In FIG. 4 there are illustrated the principal control elements in a cellular telephone system 10 for providing voice, data and other electronic telephone services to portable and mobile telephones located anywhere in a large geographical area. Terrestrial cellular telephone systems (TCTSs) 101, 102, which are types of gateways 12, 14, 16, 18, are provided with antennas 103, 104, respectively, located at many base sites throughout a geographical area to be served (e.g., SSA 24 of FIGS. 1–3). The TCTSs 101, 102 are connected to a telephone central office (TCO) 106 with voice (and data) landlines 120, 121 and with signaling network (packet) land lines 130, 131. The TCTSs 101, 102 may be any commercially available cellular telephone system or other gateway equipment (e.g., private systems). The TCTSs 101, 102 may be equipped with satellite interface equipment (SIEs) 201, 202, respectively. The SIEs 201, 202 have second antennas 203, 204, respectively, that have the purpose of transmitting signals to and receiving signals from satellites 301, 302.

A network coordinating gateway (NCG) 28 is like a TCTS 101, 102 without the cellular telephone switch (it can be co-located with a TCTS). A NCG 28 has satellite interface equipment 206, with at least one antenna 205. The satellite interface equipment 206 is connected to the packet network 32 through line 132 and interfaces with the coordination equipment 610. The TCTSs 101, 102 are connected to NCG 28 by landline 132 via TCO 106 or other suitable means. The NCG 28 is connected to network control (NC) 401 by landlines 140, 141 via the TCO 106 or other suitable means. The NC 25 is equipped with a network controller 404 and the network database 20.

The TCO 106 connects the NC 25 to the NCG 28, and connects the NCG 28 to the TCTSs 101, 102. The TCO 106 also connects the TCTSs 101, 102 to the call destination telephones 107, 108. These telephones 107, 108 may be any commercially-available product that can interface to a public switched telephone system and transmit voice and/or data. Also shown in FIG. 4 are Cellular Satellite Telephones (CSTs) 501, 502 which can be the users described in FIGS.

1–3. The Cellular Satellite Telephones 501, 502 are equipped with Cellular Telephones (CT) 503, 504, respectively, and antennas 505, 506, respectively, which transmit to and receive signals from the TCTSs 101, 102 via antennas 103, 104, respectively. In addition, the cellular satellite telephones 501, 502 are equipped with Satellite RF Units (SRFUs) 520, 521 and antennas 522, 523, which transmit to and receive signals from the satellites 301, 302 (FIG. 4). The CSTs 501, 502 also each include a Satellite Control Unit (SCU) 530, 531, respectively, which provides signaling functions to the network.

Figure 5:
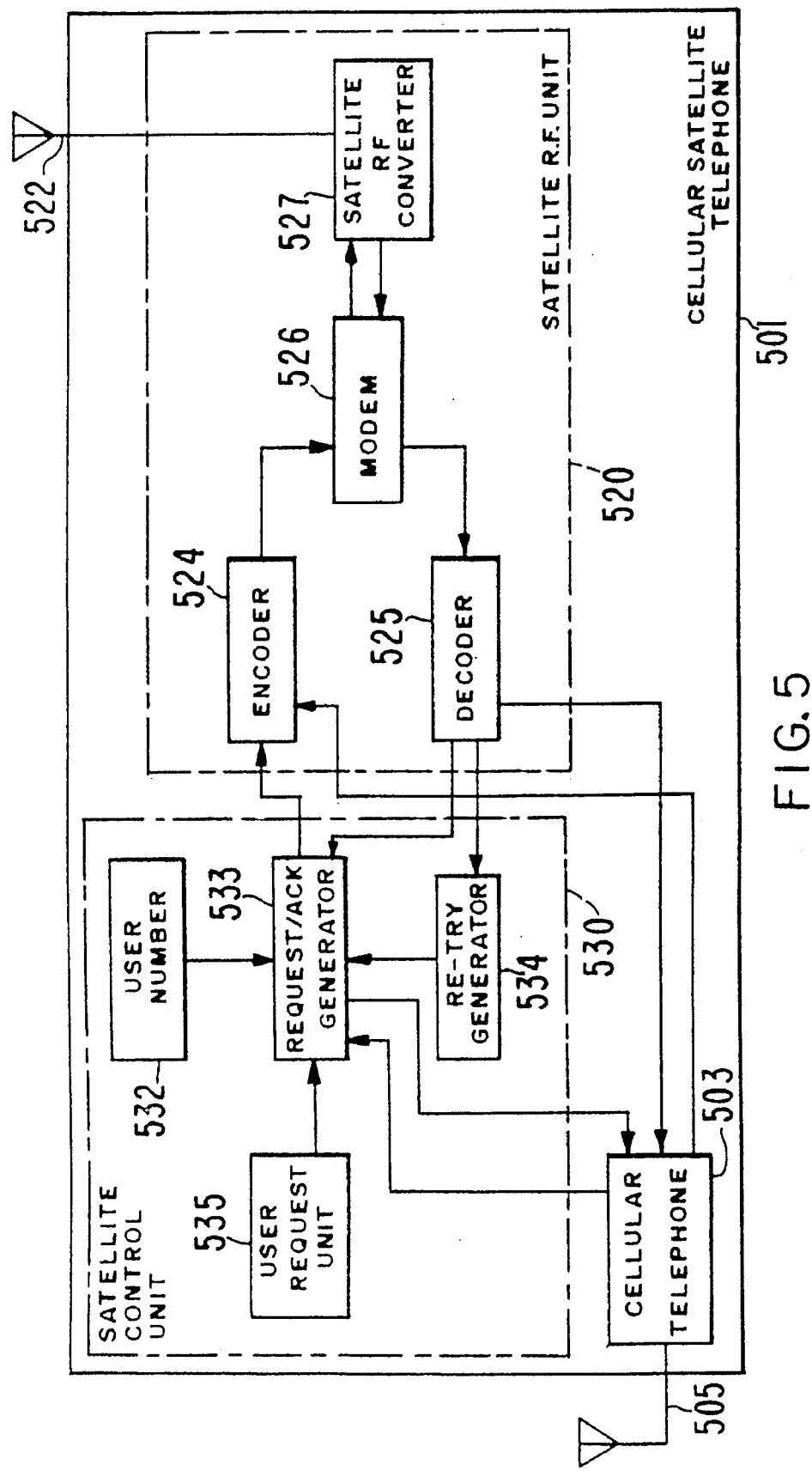
FIG. 5 is a block diagram of a wireless transceiver apparatus for use by an end user.

Referring to FIG. 5, there is illustrated in more detail a CST 501 of FIG. 4. The CST 501 may include a conventional cellular telephone 503 equipped with a transceiver, a handset, and many options (not shown), and it is expected that the terrestrial roaming network may require digital terminals for this purpose. The cellular telephone 503 accommodates multiple telephone numbers and may be assigned a special satellite roaming number. The CST 501 is further equipped with a satellite controls unit (SCU) 530, which includes storage for a user number 532, a request/ACK generator 533 and a retry generator 534. The CST 501 also includes a satellite RF Unit 520, which includes encoders 524, decoders 525, a modem 526 and a satellite RF converter 527.

When a satellite 22 is about to lose communication between a user 30 and a TCTSA 12, 14, 16, 18 that is handling the call, the active gateway 12, 16 initiates requests for a handoff to another satellite 22. Satellite resources are coordinated between the AG 12, 16 and the NCG 28 via the packet network 32. The links to establish the handoffs are shown in FIG. 4, which shows TCT 101 handing off the links to CST 501 from satellite 302 to satellite 301.

Figure 6:
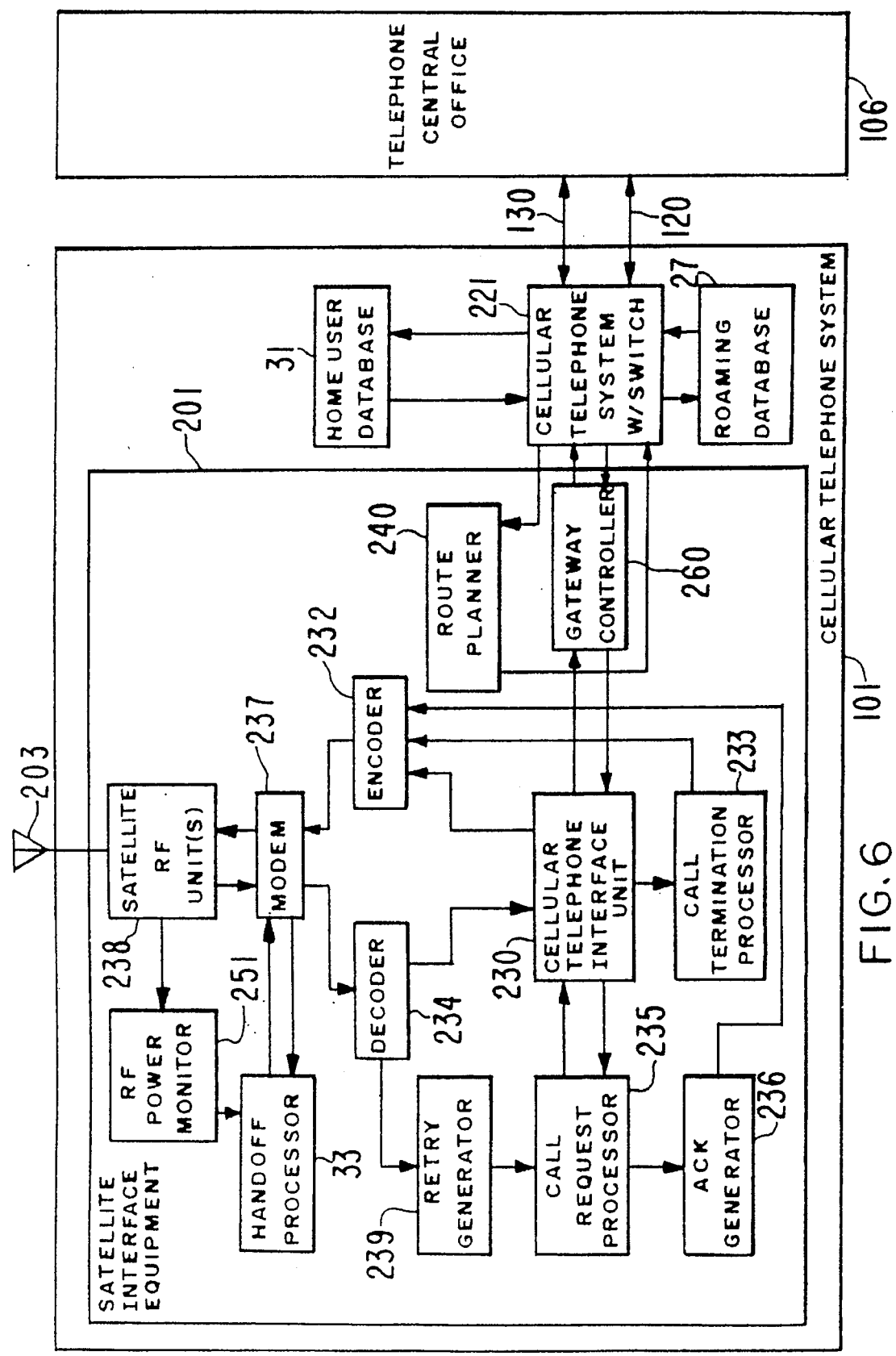
FIG. 6 is a block diagram of a gateway terminal unit for use in a cellular system according to the invention.

Referring to FIG. 6, there is shown in more detail a unit of the terrestrial cellular telephone system (TCTS) 101. The TCTS 101 with switch 221 may be any commercially available cellular telephone system or other gateway equipment (e.g., a private system). The TCTS 101 is interfaced to the Telephone Central Office 106 via landlines 120. The system is also interfaced by way of a signaling network (packet) to the TCO 106 by landlines 130 and there through to a network coordinating gateway 28 (FIG. 4) via landline 132 or other suitable means.

The TCTS cellular equipment 101 also includes special equipment according to the invention for the purpose of communicating to and from user Cellular Satellite Telephone (CTS) 501, 502 by way of radio links through the satellites 301, 302, 22. This special equipment, called the Satellite Interface Equipment (SIE) 201 (FIG. 6), includes a handoff processor 250, RF power monitor 251, and a Route Planner 240 which processes outbound calls to users 30 from other callers 50 and provides route planning to connect a caller 50 to a user 30 depending upon user location, the satellite ephemeris, and other planning criteria. The SIE 201 also includes a Cellular Telephone Interface Unit 230 that processes and conditions the voice and data signals and interfaces the call requests, call termination signals, and ACK data signals to the encoder 232, the Cellular Telephone System 221 and the Call Termination Processor 233. A Call Request Processor 235 takes access data from the decoder 234, via the retry generator 239, and either directs it to the Cellular Telephone Interface Unit 230 or routes it to the ACK generator 236. Signals from the ACK generator and the Call Termination Processor 233 are applied to the encoder 232. Modem 237 modulates signals from the encoder 232 and demodulates signals from the Satellite RF Unit 238. The output from the antenna 203 is applied to the RF unit 238 to receive signals from the satellites 301, 302, 22. Likewise, the output of the satellite RF unit 238 is applied to the antenna 203 in order to transmit to the satellite(s) 301, 302, 22. The handoff processor 250 monitors a call signal and begins handoff procedures when a signal is below a threshold or there is a satellite 301, 302, 22 that would provide better service to the user. The RF power monitor 251 checks the channel capacity of the satellite(s) 301, 302, 22 in view of the gateway 12, 14, 16, 18, and informs the handoff processor 250 of channel availability. Gateway controller 260 checks information fed to it by NCG 28 to determine availability of satellite 22 resources.

Figure 7:
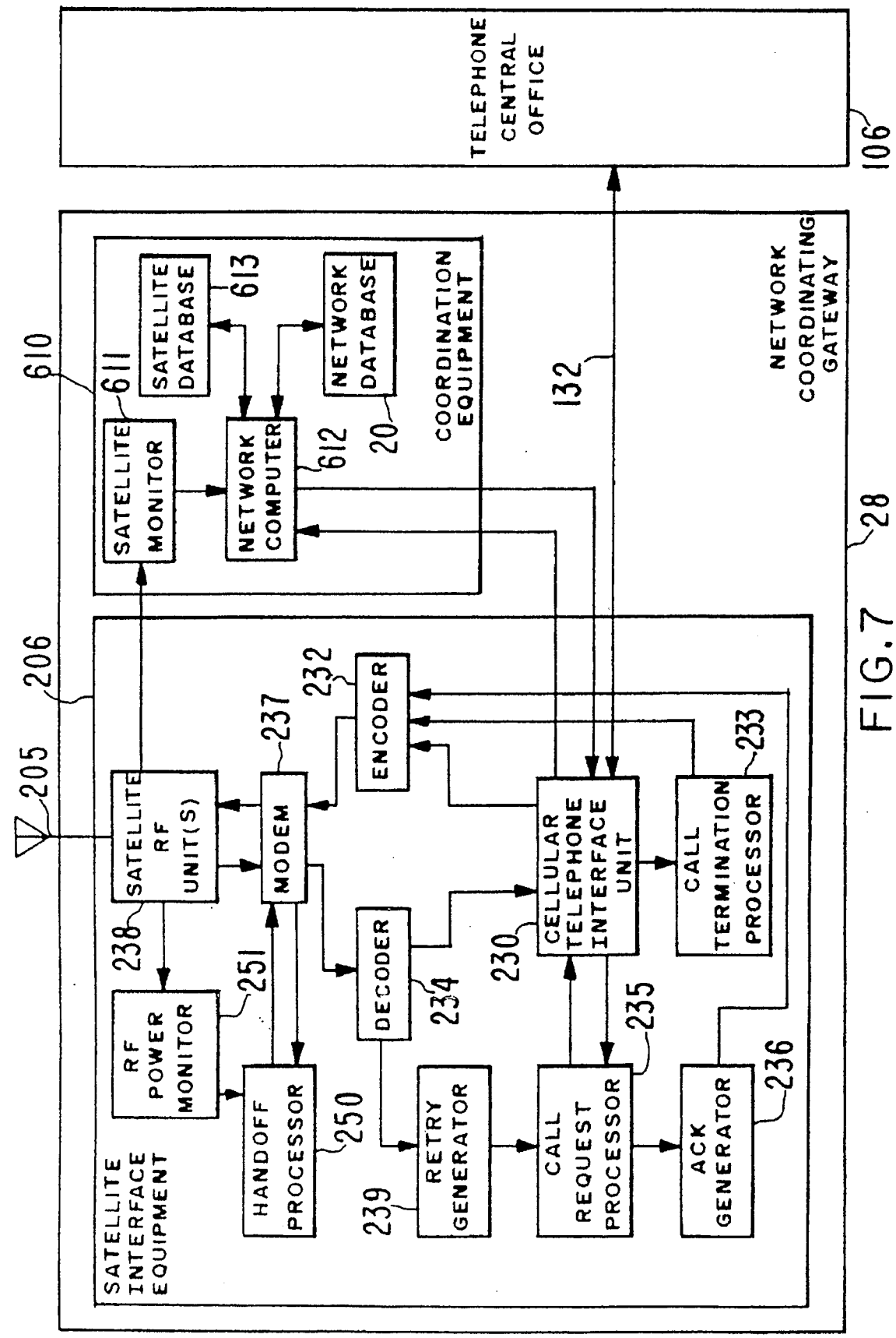
FIG. 7 is a block diagram of a network coordinating gateway for use in a system according to the invention.

Referring to FIG. 7, there is shown in more detail the Network Coordinating Gateway (NCG) 28. The NCG 28 may be co-located at a TCTS 101, 102 and may use the SIE 206. The difference between a regular gateway and a NCG 28 is that a NCG 28 comprises commercially available equipment with the express purpose of monitoring the satellite(s) 22, of assigning user channels, of creating and maintaining a database 20 of cellular telephone users that are nationwide or worldwide, and of processing inbound and outbound call requests, and does not necessarily have a cellular telephone switch.

A NCG 28 has at least one antenna 205 for communication with the satellites 22 but usually a plurality of antennas 205 so that the NCG 28 can be in communication with all satellites 22 in view. This equipment 28 may consist of computers, memory storage devices, interface equipment, modems and the like. This system may contain or be interfaced to additional databases 613 and database management systems. The database 20 is managed by a network computer 612 and receives and exchanges data from and with the Terrestrial Cellular Telephone Systems 101, 102 by way of landline 132 connected via the TCO 106. The satellite monitor 611 monitors the satellite(s) 22 in view of the NCG 28 and reports on channel capacity to the network computer 612. The satellite database 613 contains information about which satellites 22 will be in view of the NCG 28 at what time and at what look angles, and indicates the satellite resources that are available. The network computer 612 uses this information to determine satellite 22 loading and assign channels appropriately. The network computer 612 is connected to the packet network 32 and to the encoder 232 and decoder 234 through the cellular telephone interface unit (CTIU) 230. The CTIU 230 recognizes network requests such as roaming request, inbound call requests, ACK regarding network requests and discontinuance requests from users and routes those requests to the network computer 612. The CTIU 230 receives messages from the network computer 612 regarding ACK of requests from the user 30, call setup information, calling information and hailing requests to a specific user 30, and sends those messages to encoder 232. The network computer 612 receives from the packet network 32 roaming requests from the TCTSA 12, 14, 16, 18, gateway availability from gateways 12, 14, 16, 18, ACK from gateways 12, 14, 16, 18, user status from gateways 12, 14, 16, 18, channel usage from gateways 12, 14, 16, 18, billing information from gateways 12, 14, 16, 18, system information and database information from network control 25, requests for channel assignments from gateways 12, 14, 16, 18, and logout requests from the TCTSA 12, 14, 16, 18. The network computer 612 transmits through the packet network 32 to network control 25 satellite capacity, billing information, database information and other system information to the TCTSA 12, 14, 16, 18 regarding login and logout requests, and to the gateways 12, 14, 16, 18 for channel requests, user activity in the gateway's service area, call setup information, location of home users, and other system information.

Figures 8, 9:
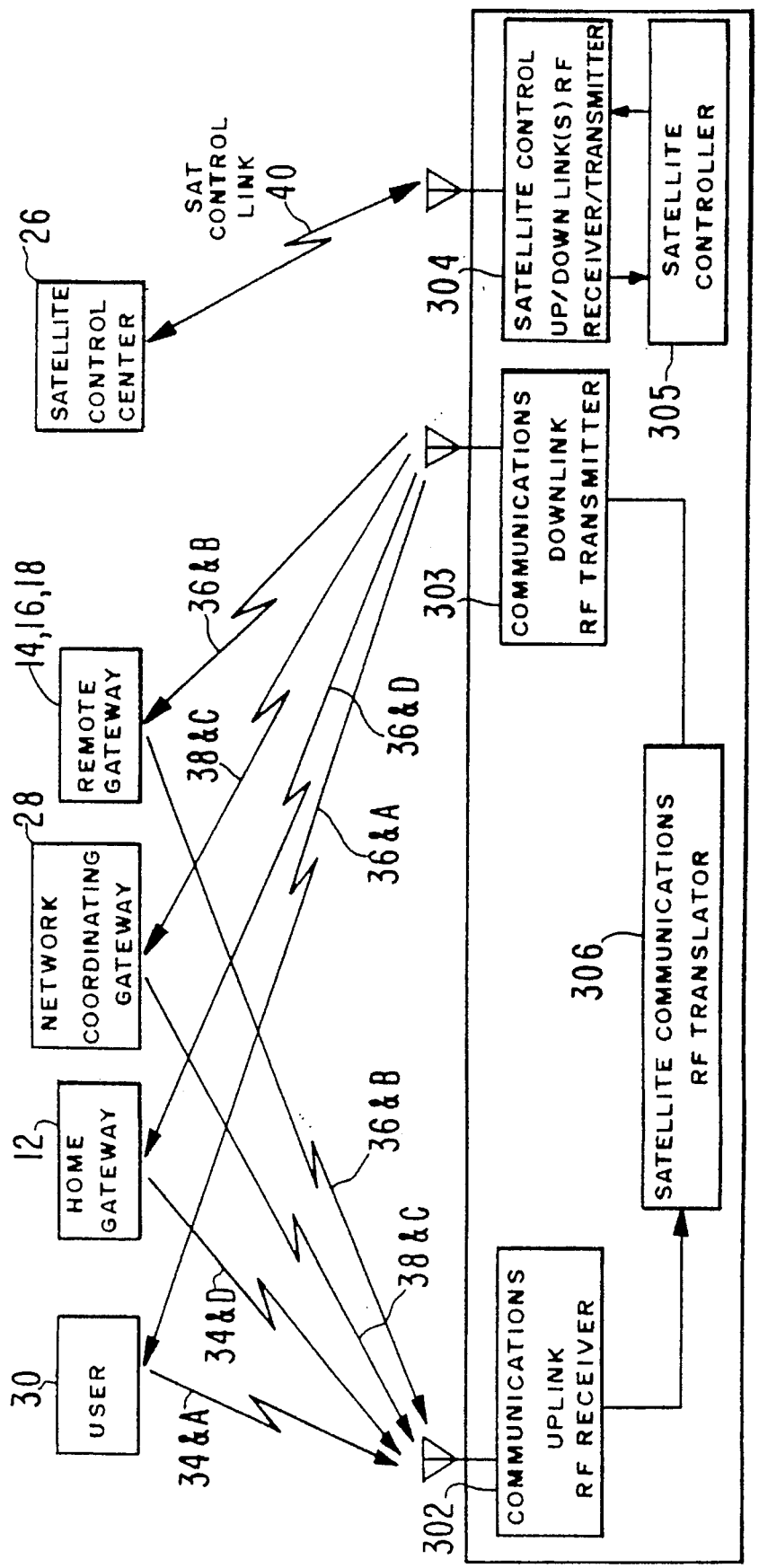
FIG. 8 is a block diagram of a network control center for use in a system according to the invention.
FIG. 9 is a block diagram of a satellite system for use in a system according to the invention.

Referring to FIG. 8, there is shown in more detail the Network Control (NC) 25. The NC 25 comprises commercially available equipment with the express purpose of creating and maintaining a database 20 of cellular telephone users that are nationwide or worldwide, collecting all billing and system usage information, coordinating between NCGs 28, and coordinating satellite 22 performance information that is pertinent to the system and to the NCGs 28. This equipment 25 may consist of computers, memory storage devices, interface equipment and the like. This system 25 may contain or be interfaced to additional databases and database management systems. The network database 20 is managed by a network controller 404, receives and exchanges data from and with the network coordinating gateway(s) 28 by way of landlines 140, 141 connected via the TCO 106 or other suitable means, and receives and exchanges data from and with the Satellite Control Center 26.

A functional block diagram of the satellite 22 payload 301 is shown in FIG. 9. The satellite payload 301 comprises Satellite Communications RF Translator (SCT) 306, communications uplink RF receiver 302, communications downlink RF transmitter 303, satellite control uplink/downlink RF receiver/transmitter 304, satellite controller 305, and support elements not shown.

The communications uplink RF receiver 302 receives signals from transmitters on the ground by an antenna, and applies the signals to the SCT 306. The SCT 306 translates the signals from the uplink frequency to the downlink frequency and applies the signals to the communications downlink RF transmitter 303. The communications downlink RF transmitter 303 amplifies the signals, and transmits the signals to the ground by an antenna.

A separate set of satellite control links, shown as the satellite control uplink/downlink receiver/transmitter 304, are used for controlling the satellite subsystems, for maintaining the satellite operation software, and for reporting subsystem status. The uplink signals to the satellite 22 are sent by receiver 304 to satellite controller 305, where they are downconverted to baseband. The satellite controller 305 decodes the control messages and performs the appropriate actions. Digital signals from other portions of the satellite 22, databases, buffers, storage, and satellite operation software are applied to the satellite controller 305. The satellite controller 305 encodes these signals and sends the signals to the satellite control uplink/downlink receiver/transmitter 304 for conversion to RF and transmission to the ground. Satellite controller 305 does not handle any of the communications traffic, i.e. the voice, data or other messages that are passed from the user 30 to the caller 107, 108, 50 and vice versa. As stated previously, there is no on-board signal processing of the communications traffic in the present invention.

It is useful to understand the operation of the system by users and callers. A user 30 is defined to be an operator who is equipped with a device capable of requesting access, making and receiving calls with equipment 501, 502 shown in FIG. 4 via satellites 301, 302, 22 cellular telephone system equipment 101, 102 or the equivalent, terrestrial lines or equivalent means 120, 121, telephone central office or other central switching means 106, and terrestrial lines or other equivalent means 123, 124 to callers 107, 108, 50. A caller is defined to be an operator who is equipped with a device capable of requesting access, making and receiving calls with equipment 107, 108 via terrestrial lines or equivalent means 123, 124, and telephone central office or other switching 106, and terrestrial lines or equivalent means 120, 121 and cellular telephone system equipment 101, 102 or the equivalent, and via satellites 301, 302, 22 to the user 30 equipped with equipment 501, 502.

The following description details the method of operation of the system for carrying out several processes.

These processes are;
1 Establishing a user 30 as a roamer in a SSA 24
1A Request for roaming by user 30 in SSA 24
1B Request for roaming by user 30 in a TCTSA 12, 14, 16, 18
2 Call initiation by a user 30 (an Inbound Call)
2A Call request (Inbound)
2B NCG 28 acceptance of calls from user 30
2C Inbound call setup process, AG 16 acceptance
2D Inbound call acceptance retry notice
2E Inbound call duplex operation
2F Handoff of inbound and outbound calls
2G Call termination of inbound and outbound calls
3 Call initiation by a caller 50 (an Outbound Call)
3A Call request (Outbound)
3B NCG 28 acceptance of calls from caller 50 (Outbound)
3C Outbound call setup process, AG 16 acceptance
3D Outbound call duplex operation
3E Handoff of Outbound calls
3F Call termination (Outbound call)
4 Notification to discontinue roaming by user 30
4A Request to discontinue roaming by user 30 in SSA 24
4B Request to discontinue roaming by user 30 in a TCTSA 12, 14, 16, 18

These processes and their sub-processes as explained hereinafter are outlined in a flow chart shown in FIGS. 10A through 10L.

ESTABLISHING A USER 30 AS A ROAMER IN A SSA 24

Figure 10A:
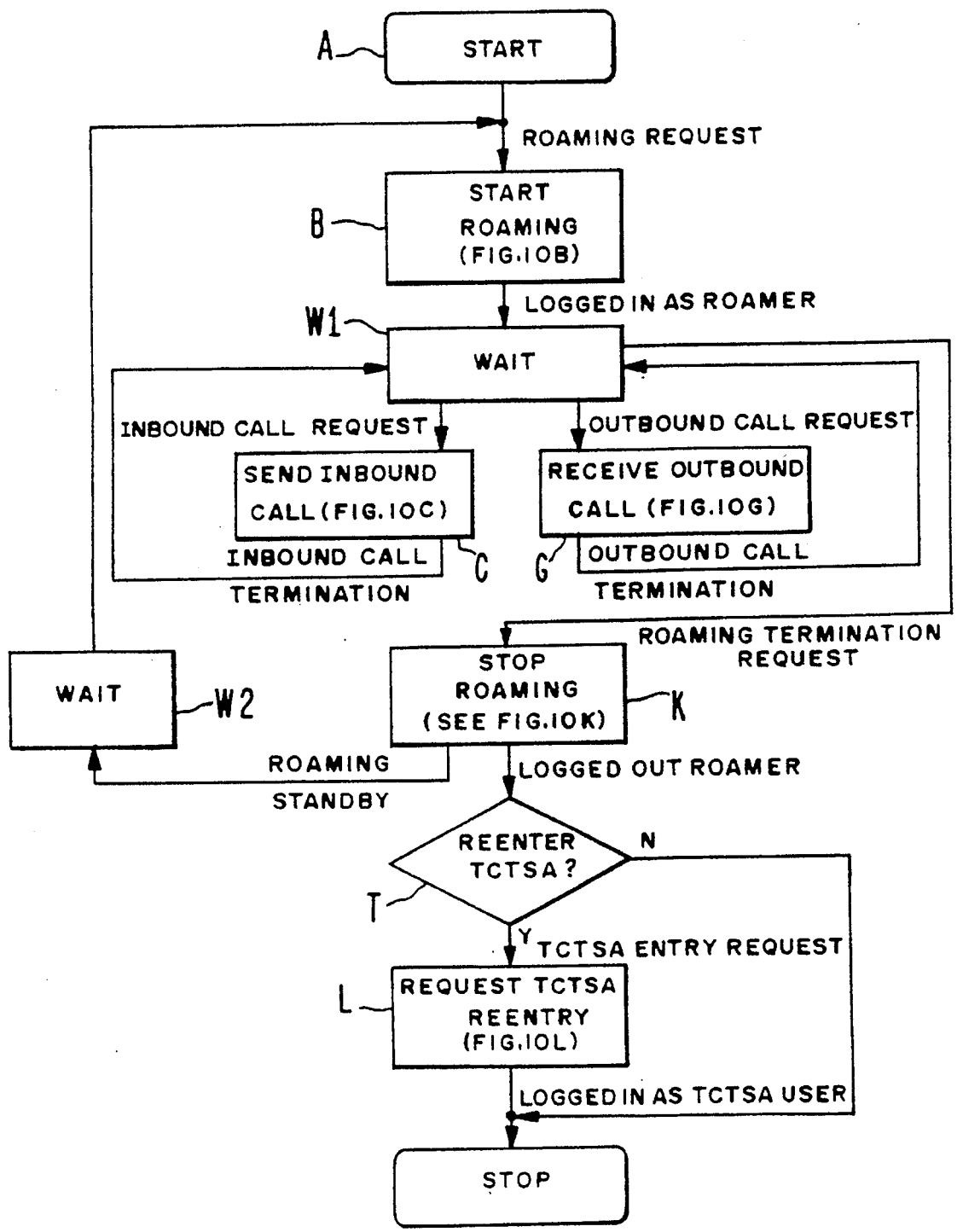
FIGS. 10A–10L together are a flow chart of operation of a specific embodiment of the invention.

Consider a user 30 wishing to be established as a roamer. The user 30 must establish that he is an authorized user 30 to have access to the communications facility (FIG. 4; FIG. 10A Step B, FIG. 10B). The user 30 has two options; he may notify Network Coordinating Gateway (NCG) 28 of his intention while in a SSA and out of range of a TCTSA 12, 14, 16, 18 and have his request processed via a satellite relay to the NCG 28 (FIG. 10B, Steps B1, B2, B3); or he may make his request via a participating TCTSA 12, 14, 16, 18 (Steps B1, B4, B3). These two cases are now described:

REQUEST FOR ROAMING BY USER 30 IN SSA 24

Referring to FIG. 2, a method of a user 30 signaling the NCG 28 that he wishes to roam is illustrated. In this case the potential roamer 30 is located in the SSA 24 and not in a TCTSA 12, 14, 16, 18. The user 30, operating the wireless satellite telephone 501, 502, either manually or automatically actuates user request Unit 535 (FIG. 5) which activates Request/ACK generator 533 and formats a preset user number 532 onto a data stream and passes it to encoder 524. Encoder 524 processes the datastream into a signal and routes it to modem 526 for modulating the signal, which passes it to Satellite RF Converter 527, which then activates the satellite antenna 522 and causes an RF signal to emanate from the device.

The user 30 transmits data to the NCG 28 through the satellite 22. The data include user identification number and a request for roaming. This signal is transmitted via link "A" in FIG. 9 to the satellite 22. The signal is received by the communications uplink RF receiver 302, which applies the signal to the SCT 306, which translates the frequency of the signal, and applies it to the communications downlink RF transmitter 303 which amplifies and transmits the signal to the ground by an antenna. The satellite 22 transmits the signal via link "C" to the NCG 28. The signals are received by the NCG equipment 28 (FIG. 7) by antenna 205 and applied to the satellite RF unit(s) 238. There may be more than one satellite 22 in view of the user 30. Each satellite 22 repeats the signal to the ground. There may be one or more NCGs 28 in view of each satellite 22.

After processing by satellite RF unit(s) 238, the signal is applied to modem 237 for demodulation and thence to decoder 234. After decoding, the signal is applied to cellular telephone interface unit 230 which recognizes the data as a login request and passes the data to network computer 612. Network computer 612 chooses to accept the call or not based on an algorithm which contains the location of the other NCGs 28 and based on the user 30 location. The NCG 28 may perform a position location on the user 30 if necessary.

Network computer 612 sends an ACK signal on a preset frequency to the user 30 by sending a signal to cellular telephone interface unit 230 which signals call request processor 235. Call request processor 235 signals ACK generator 236 to signal the user 30 through the satellite 22 that it has received the roaming request. This ACK signal is applied to encoder 232 and modem 237 and passed to satellite RF unit(s) 238. After processing, it is applied to antenna 205 for transmitting to satellite 22.

Referring to FIG. 9, the ACK signal is transmitted over link "C" (38) to satellite 22. The signal is received by satellite 22 and transmitted over link "A" 34 to the user 30.

Referring to FIG. 5, the signal is received by the user satellite telephone 501 by its antenna 522 and applied to the user's satellite RF converter 527. The resulting signal is passed to modem 526 for demodulation then decoded by decoder 525. The resulting signal is sent to request/ACK generator 533 which shifts the cellular telephone 503 to stand-by.

Network computer 612 also selects the active gateway (AG) 16 that is going to be used based on user 30 location or other criteria given by the system 10. Network computer 612 then verifies the user 30 as acceptable for authorization to use the system 10. If the user 30 is not acceptable for authorization to use the system 10, network computer 612 does not update network database 20 and ignores the user 30 request. Upon acceptability of the user 30 as an authorized user, network computer 612 updates network database 20 to show the user 30 as being active, the user 30 location, and the selected AG 16. The computer 612 interrogates the network database 20 for the identity of the user's home gateway (HG). The HG may be outside the confines of SSA 24, but for purposes of this discussion we will assume that HG is one of 12, 14, 16, 18.

The network computer 612 sends the user ID along with user location and the selected AG 16 to the user's HG 12, 14, 16, 18 via the packet network 32 through landlines 132. The data are received by the HG 12, 14, 16, 18 by the cellular telephone system 101 through landlines 130. The cellular telephone system 101 updates the home user database 31 to show the user 30 as roaming, the user's location and the AG 16.

Network computer 612 sends user ID, user location and the call setup information to the AG 16. This information might include call setup transmit and receive channels, transmit and receive codes if CDMA is used, and other information, by formatting a message which contains the data and sending them to the cellular telephone interface unit (CTIU) 230 (FIG. 6), which routes the data to the packet switch network 32 through landlines 132. The data are received by the AG 16, 102 by cellular telephone system 222 through landlines 131. The cellular telephone system 222 updates the roamer database 27 to show the user 30 as roaming, the user's location, and call setup information.

The AG 16 then sends call setup data to the user 30 through the selected satellite 22. This information might include call setup transmit and receive channels, transmit and receive codes if CDMA is used, and other information, by formatting a message which contains the data and sending them to the cellular telephone interface unit 230 (FIG. 6), which applies the signal to encoder 232 and modem 237 and thence to satellite RF unit(s) 238. After processing, the signal is applied to antenna 203 for transmitting to the satellite 22. Referring to FIG. 9, the ACK signal is transmitted over link "B" (36) to the satellite 22. The signal is received by the satellite 22 and transmitted over link "A", (36) to the user 30.

Referring to FIG. 5, the signal is received by the user satellite telephone 501 by its antenna 522 and applied to the user's satellite RF converter 527. The resulting signal is passed to modem 526 for demodulation, then decoded by decoder 525. The resulting signal is sent to request/ACK generator 533 which shifts the cellular telephone 503 to the proper channel for non-CDMA operation, or provides modem 526 with the call CDMA codes for reception and goes to ready.

REQUEST FOR ROAMING BY A USER 30 IN A TCTSA 12, 14, 16, 18

Figure 10B:
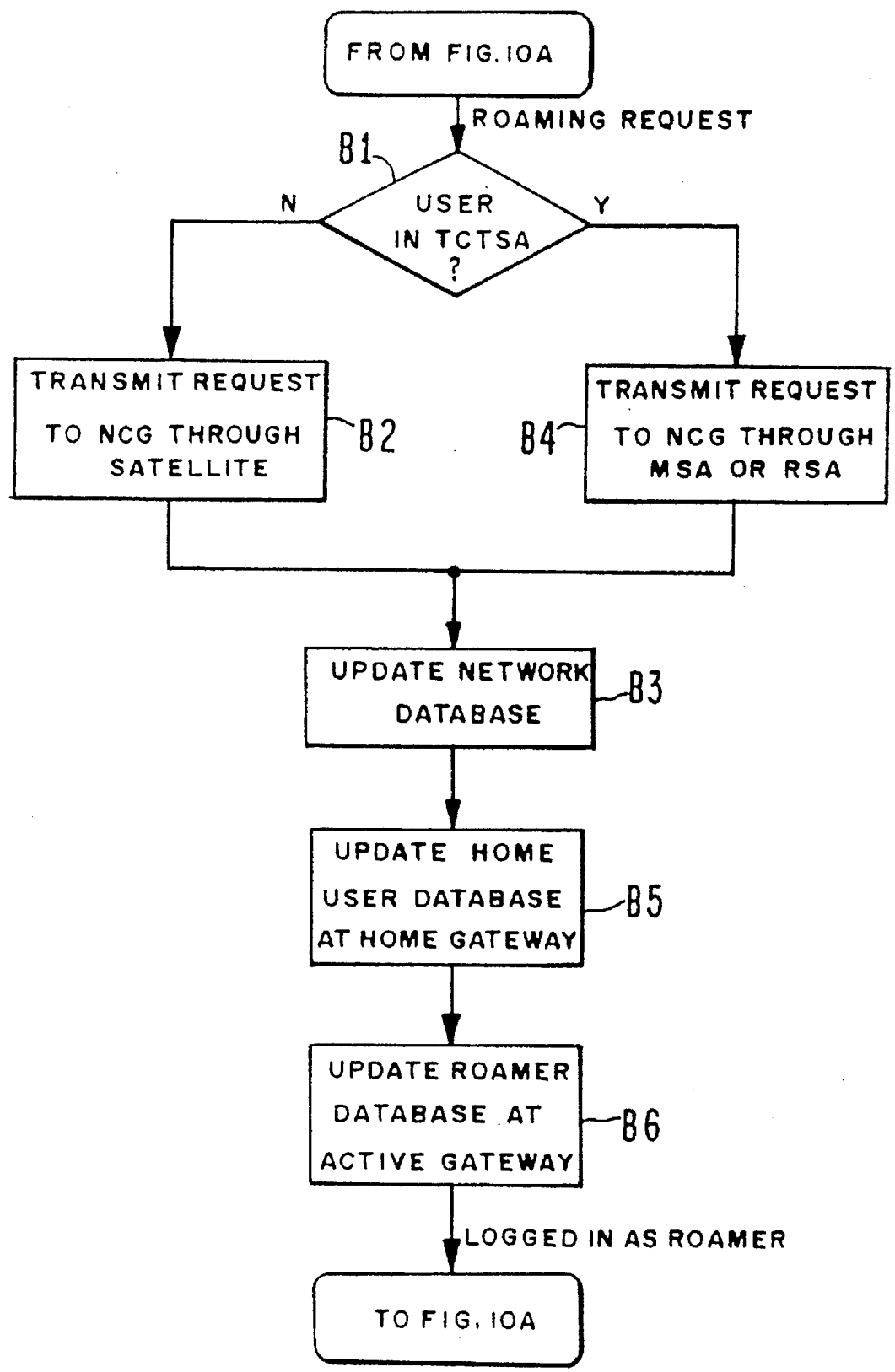

The second method of requesting roaming in an SSA 24 is to make the request while in a TCTSA 12, 14, 16, 18. The user 30 either manually or automatically activates his wireless satellite telephone transceiver User Request Unit 535 (FIG. 5). A signal, including the user number, location, and codes to indicate the user 30 wishes to roam in the SSA 24, is sent to the Cellular Telephone System (CTS) 101, 102 by antenna 505 (FIG. 4; FIG. 10B, Step B4). The CTS 101, 102 formats a data signal which is conveyed via landline 130, 131 to the TCO 106 and then to the NCG 28 via landline 132.

Referring to FIG. 7, the signal is then applied to network computer 612, which updates network database 20 and interrogates database 20 to verify the user 30 as acceptable for authorization to use the system 10. Network computer 612 then verifies the user 30 as acceptable for authorization to use the system 10. If the user 30 is not acceptable for authorization to use the system 10, network database 20 is not updated and network computer 612 sends a message to the CTS, 101, 102 to ignore the request via the packet network 32 through landlines 132. Upon acceptability of the user 30 as an authorized user, computer 612 selects the active gateway AG 16 that is going to be used and updates network database 20 to show user 30 as being active, user location, and the selected AG 16.

Network computer 612 sends user ID, user location and the call setup information to the AG 16. This information might include call setup transmit and receive channels, transmit and receive codes if CDMA is used, and other information, by formatting a message which contains the data and Sending them to the cellular telephone interface unit (CTIU) 230 (FIG. 6), which routes the data to the packet switch network 32 through landlines 132. The data are received by the AG 16, 102 by cellular telephone system 222 through landlines 131. The cellular telephone system 222 updates the roamer database 27 to show the user 30 as roaming, the user's location, and call setup information.

Network computer 612 interrogates the network database 20 for the user's home gateway (HG) 12, 14, 16, 18, 101. The network computer 612 sends the user ID along with user location and the selected AG 16 to the user's HG 12, 14, 16, 18, 101 via the packet network 32 through landlines 132. The data are received by the HG 12, 14, 16, 18, 101 by the cellular telephone system 221 through landlines 130. The cellular telephone system 221 updates the home user database 31 to show the user 30 as roaming, the user's location, and the AG 16. The network computer 612 then sends a message to the CTS 101, 102 to transmit to the user 30 call setup data, which might include call setup, transmit and receive channels, transmit and receive codes if CDMA is used, and other information. The CTS 101, 102 transmits this data to the user 30. The user 30 receives this data and goes to ready.

CALL INITIATION BY A USER 30 (AN INBOUND CALL)

Referring to FIG. 5, the process to initiate a call from a user 30 while roaming in an SSA 24 is as follows:

CALL REQUEST (INBOUND)

Figure 10C:
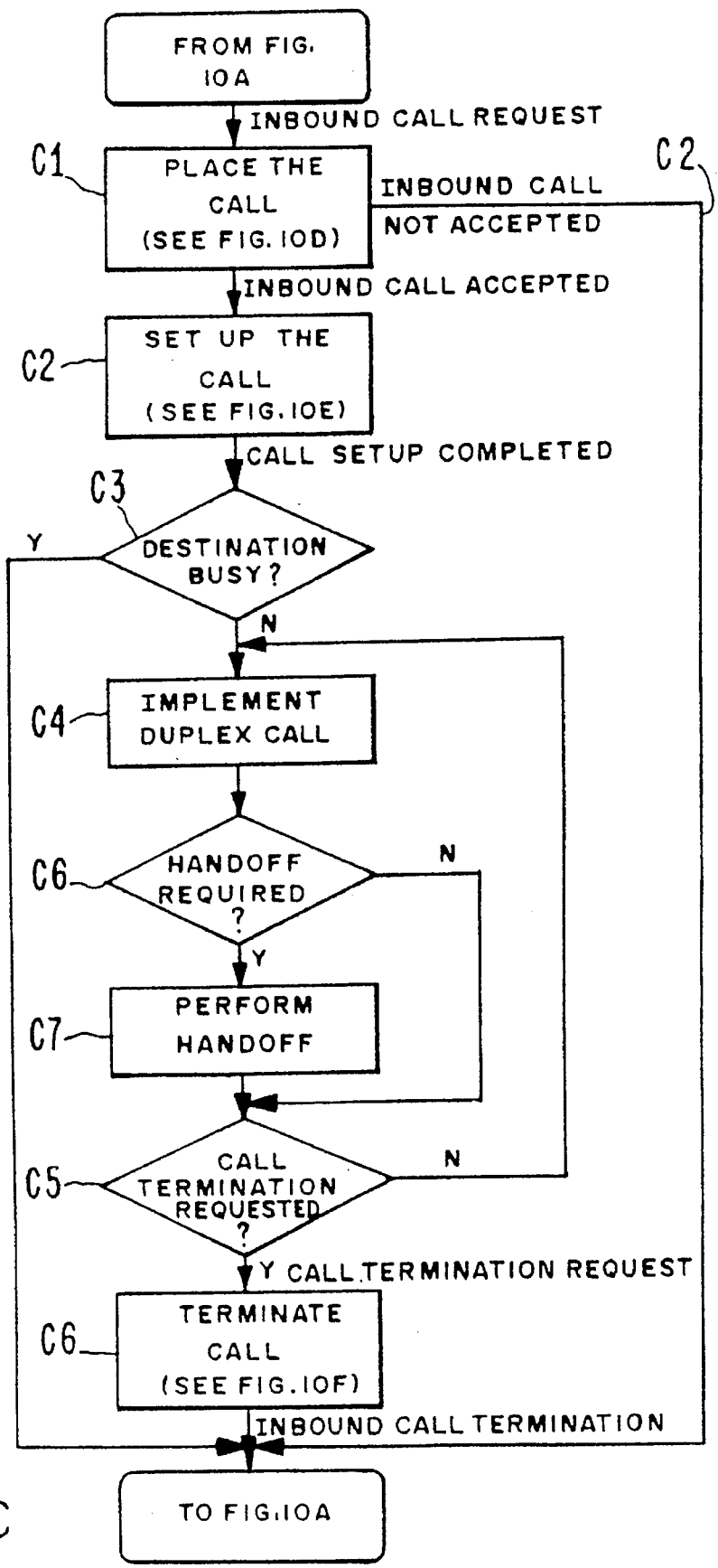

To make a call request, the user 30 dials the destination telephone 107, 108, 50 telephone number by the use of the keypad of the Cellular Telephone 503 (See FIG. 10A Step C, FIG. 10C Step C1). The number is passed to the Satellite Control Unit 530 and into Request/ACK generator 533. The user number 532 is added to the signal and passed to encoder 524 and processed into a data stream which is applied to modem 526. Two methods are available for the user 30 to access the satellite 22. Method 1: An FDM-FM or other modulation using contention multiple access, operating on a hailing channel, may be used to signal the satellite 22. Method 2: A special identifying CDMA code is placed in the User Request Unit 535. The satellite 22 simply repeats to the ground the signals it receives, so the method makes no difference to the satellite 22. The resulting modulated signal is then applied to the Satellite RF Converter 527 and routed to the satellite antenna 522 and transmitted to the satellite(s) 22 within range. The satellite(s) 22 within range repeat the signal to the ground.

AG 16, 101 ACCEPTANCE OF CALLS FROM USER 30 (INBOUND)

Figure 10D:
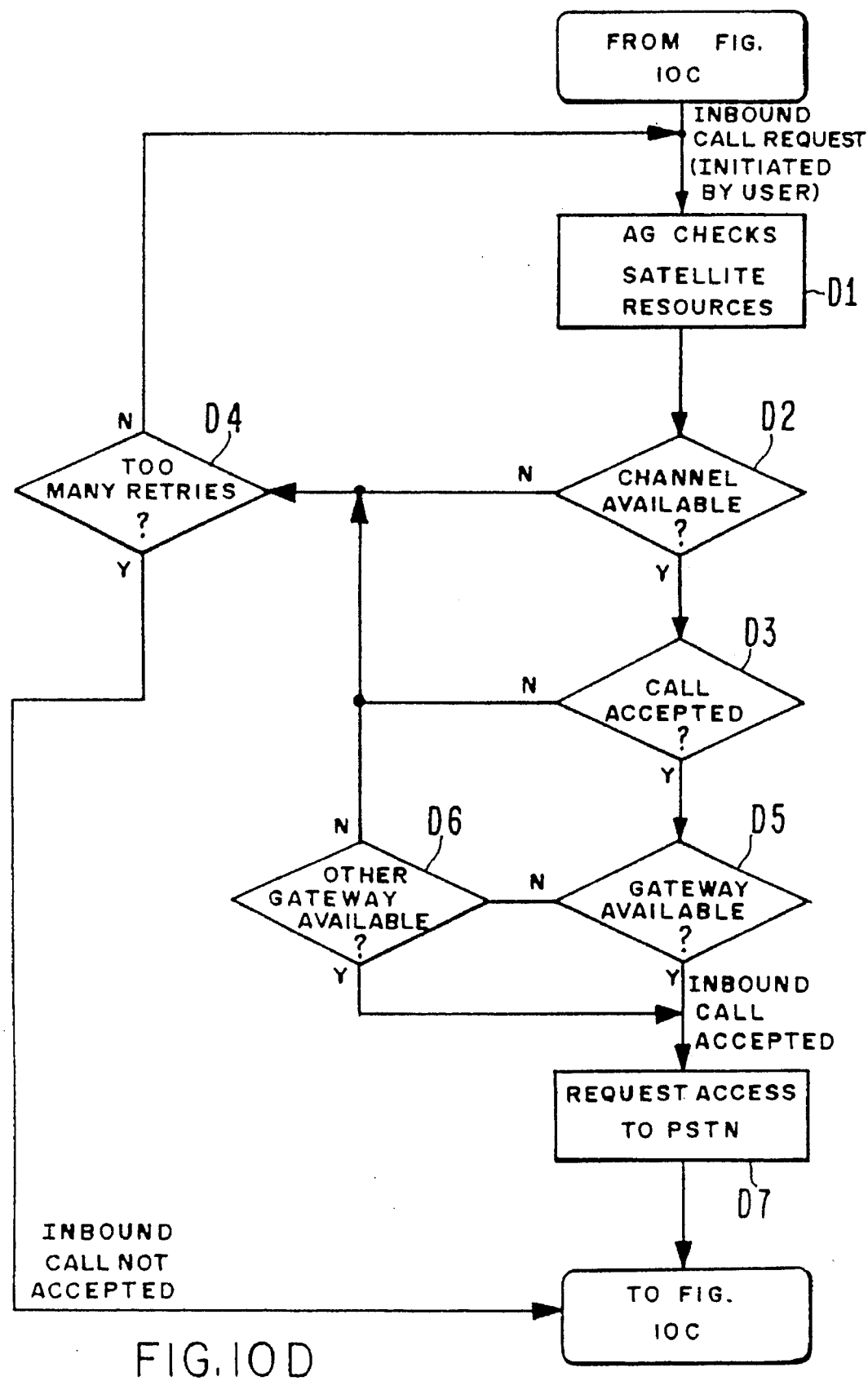
Figure 10E:
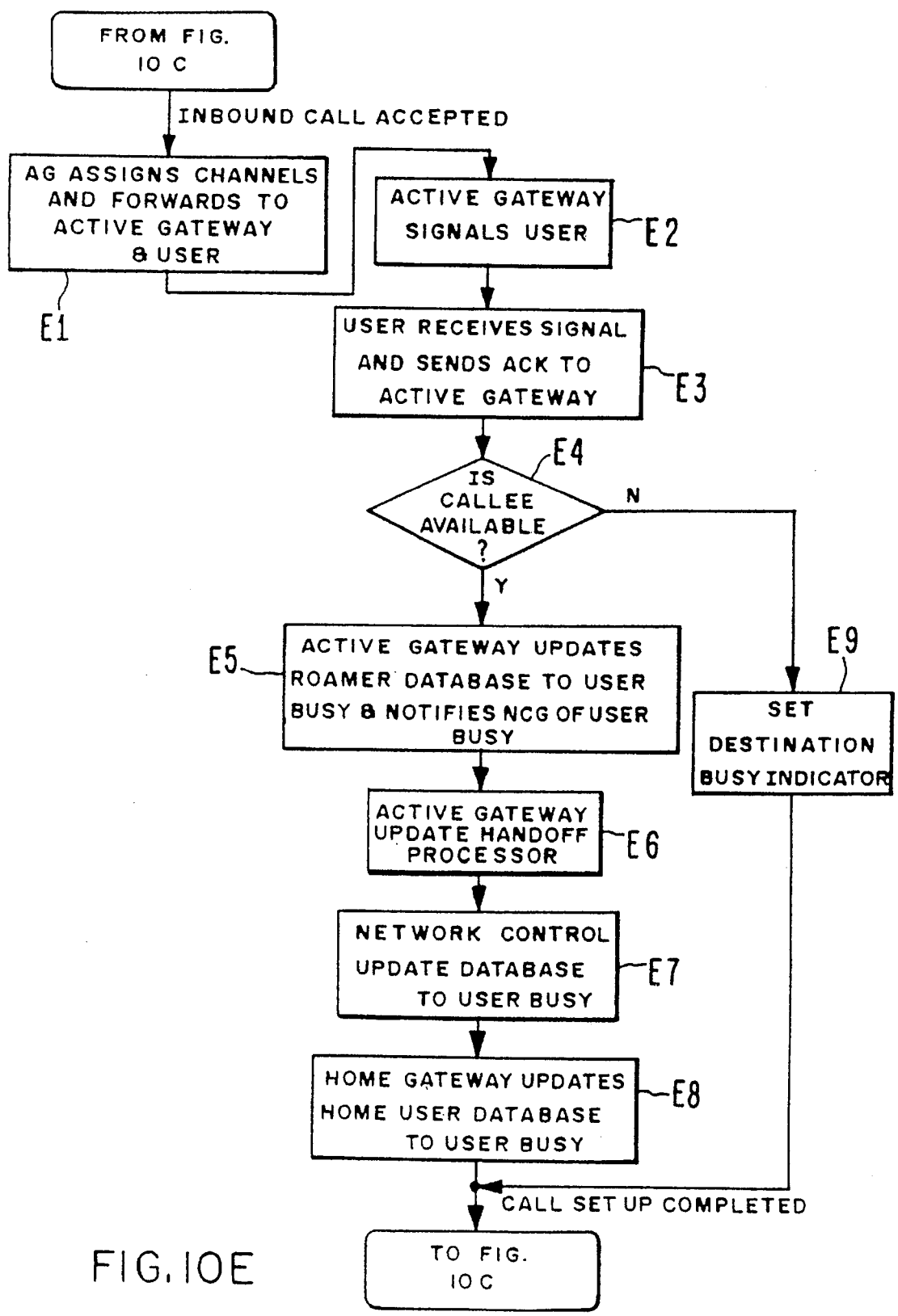
Figure 10F:
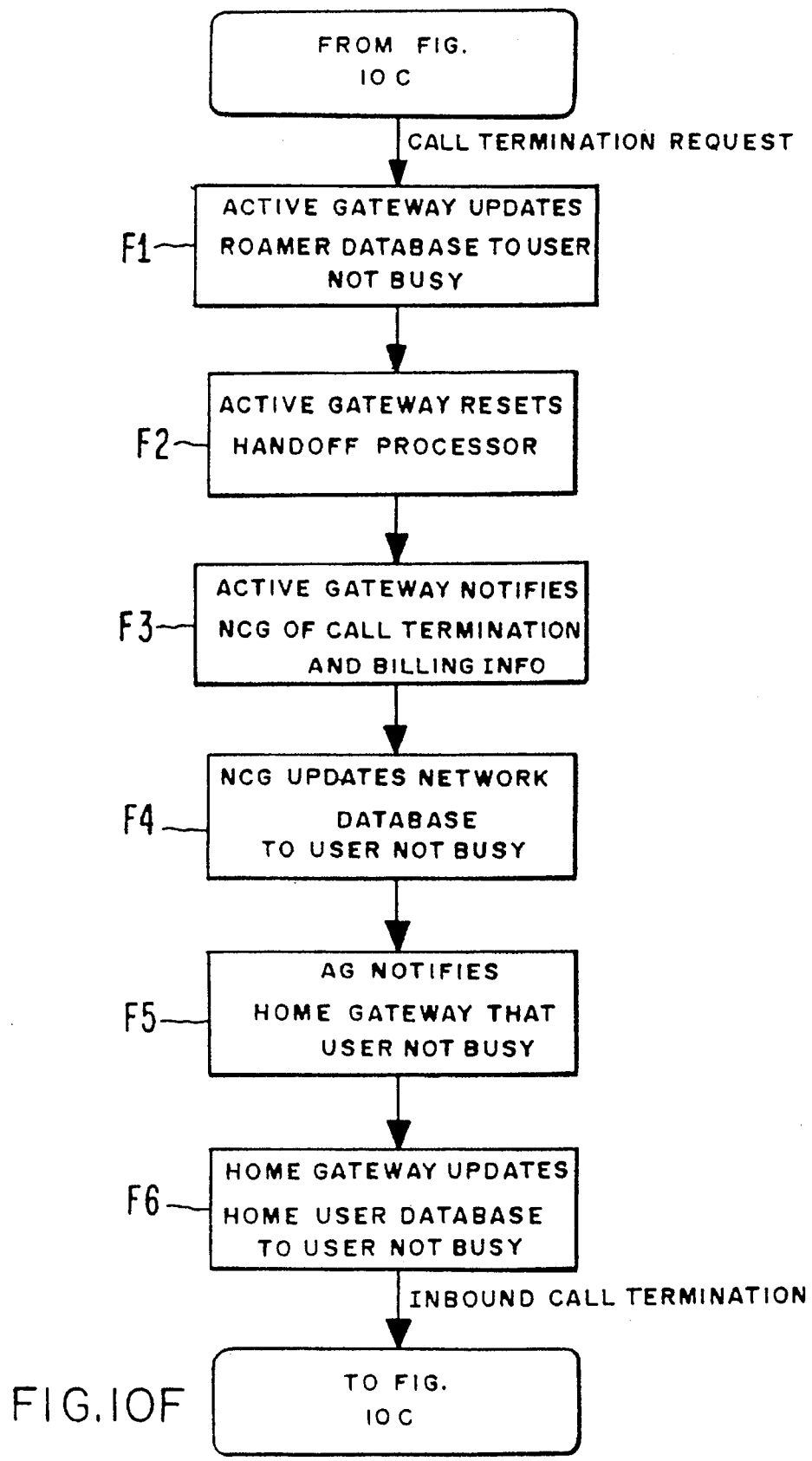
Figure 10G:
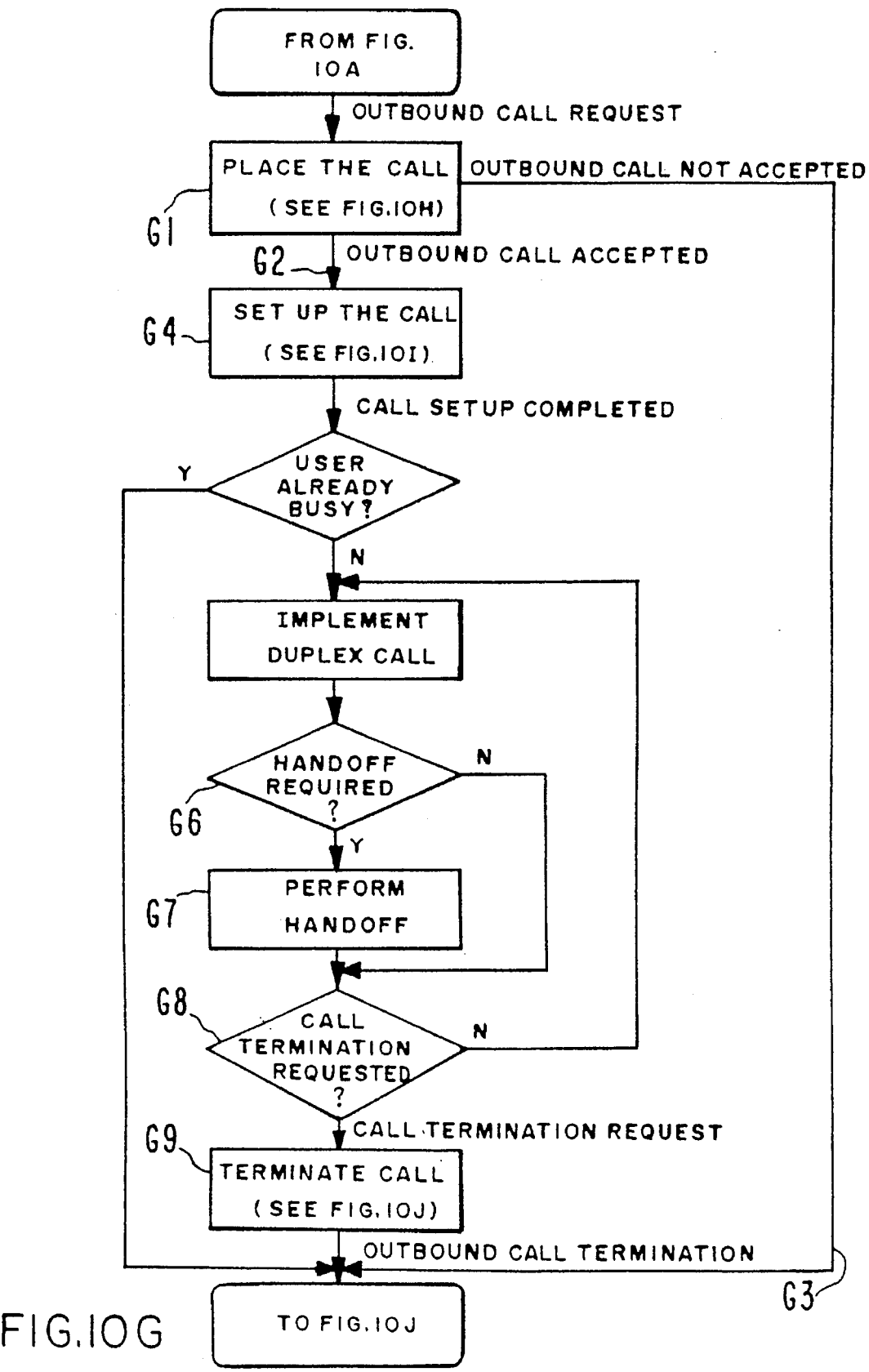
Figure 10H:
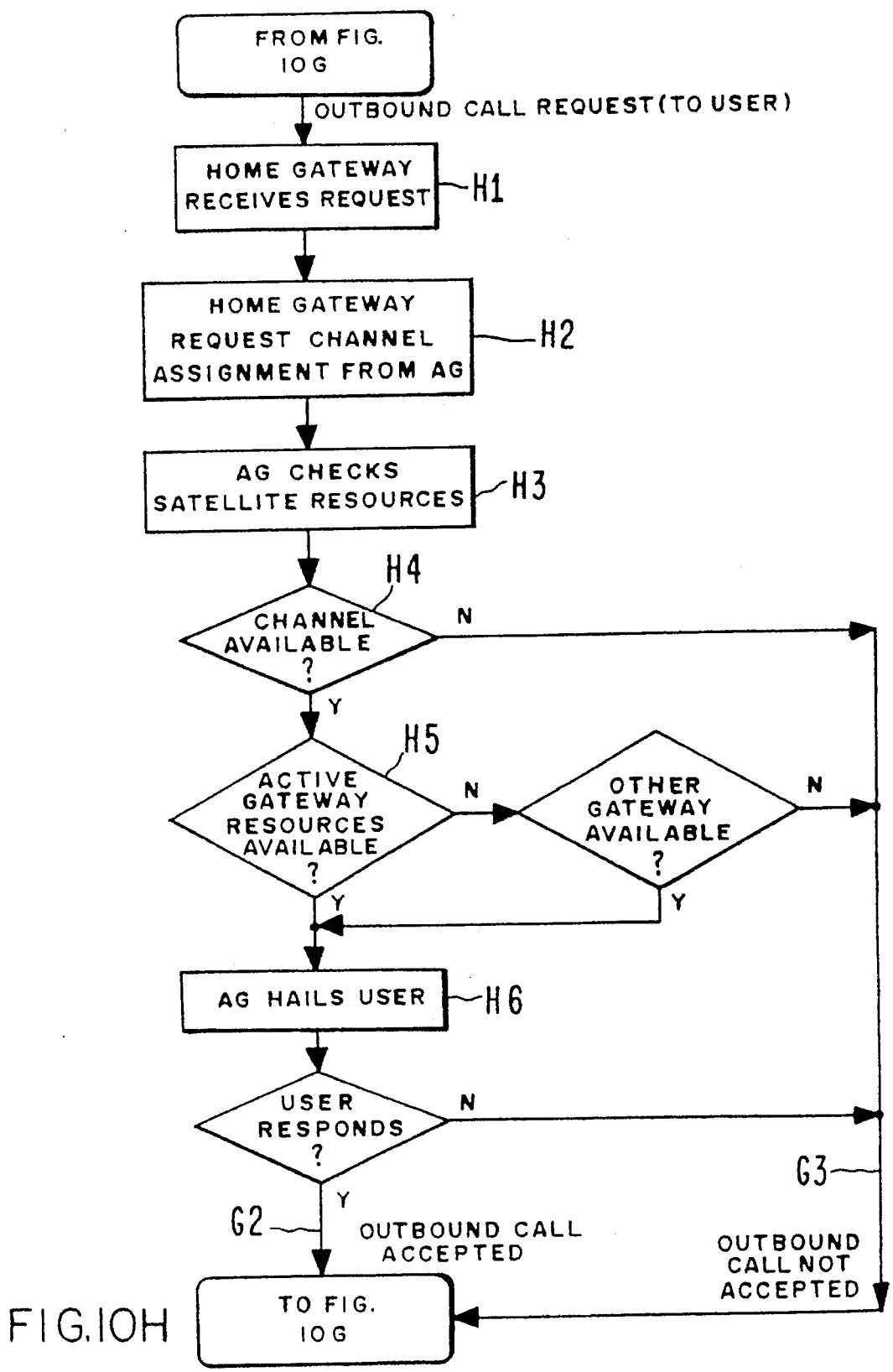
Figure 10:
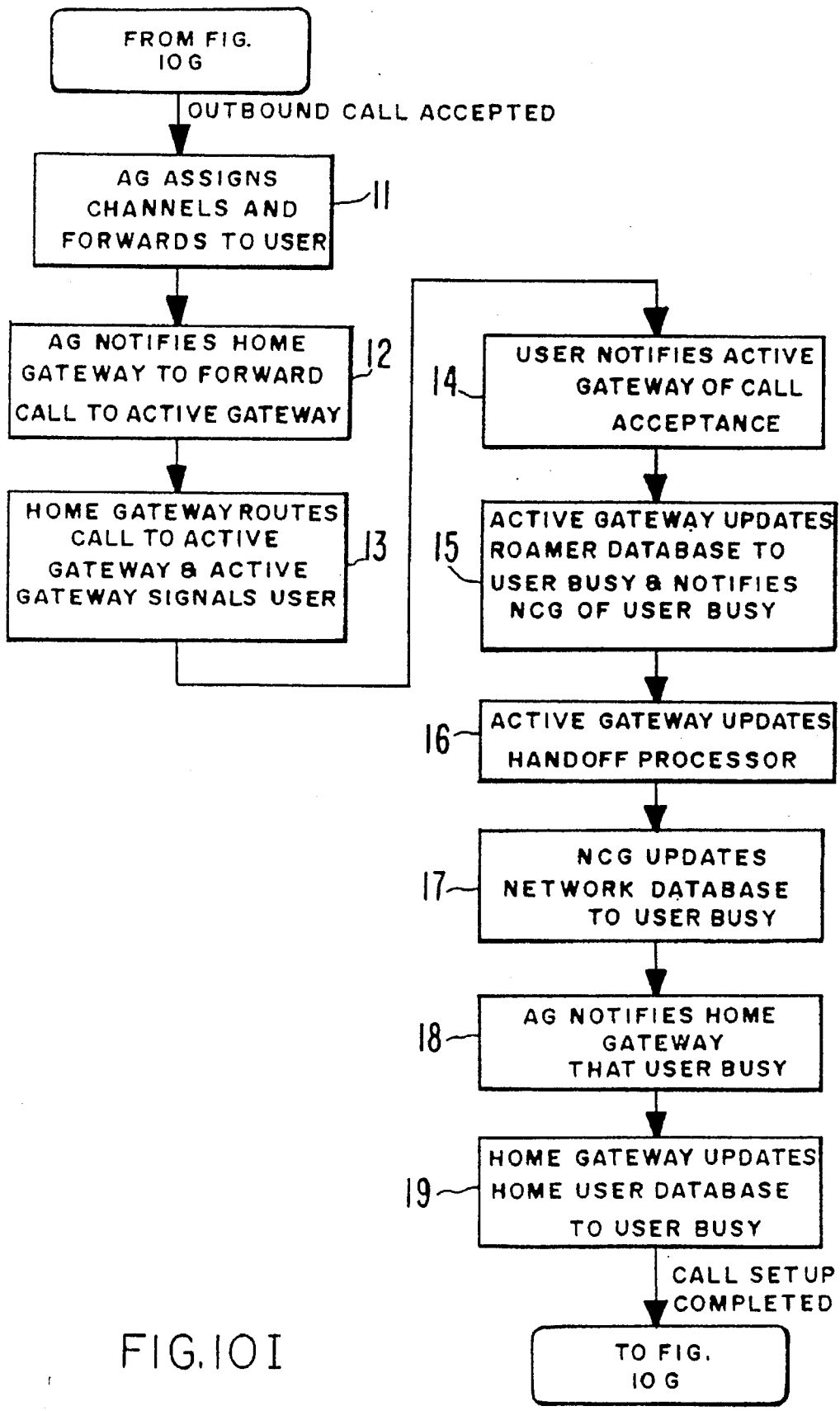
Figure 10J:
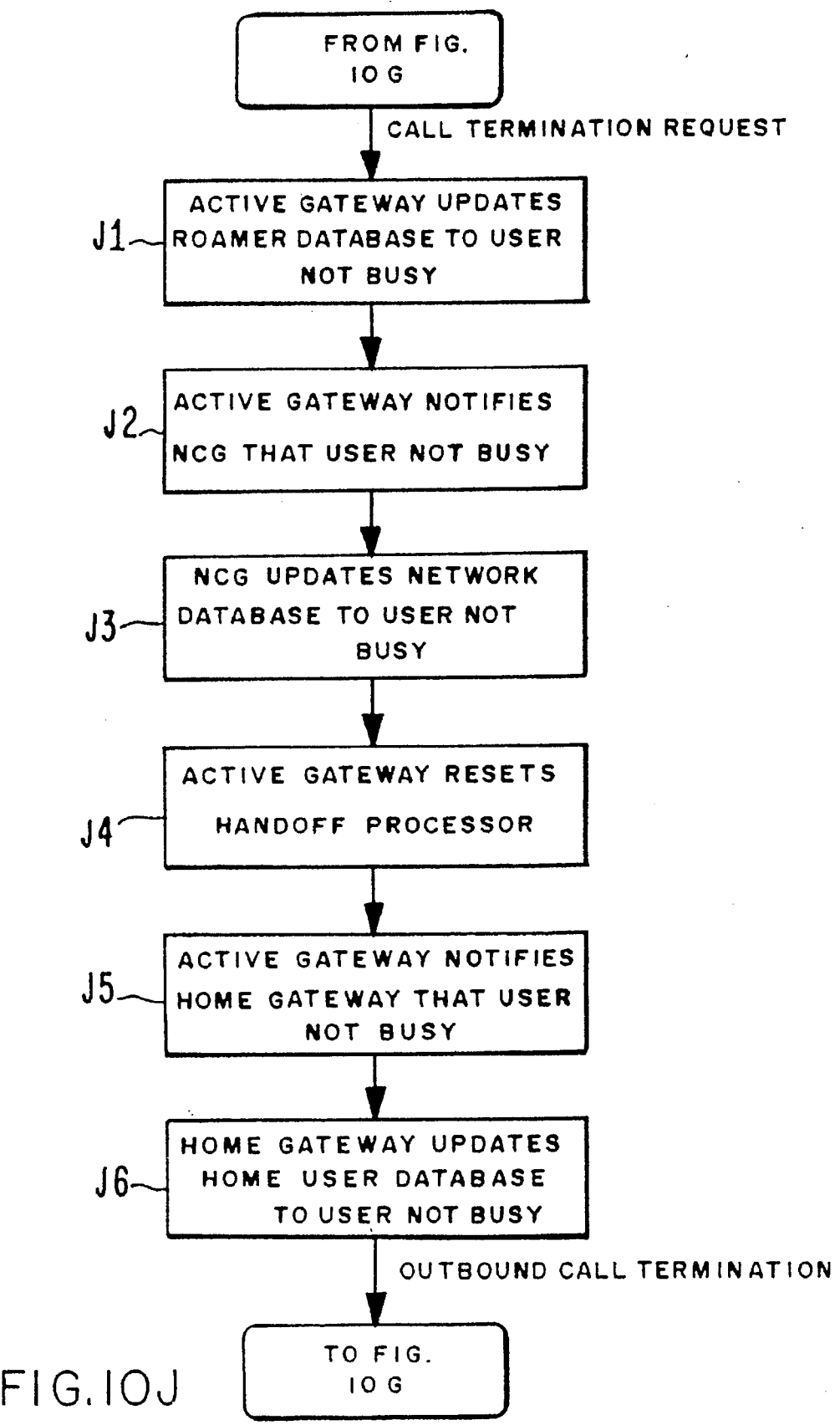
Figure 10K:
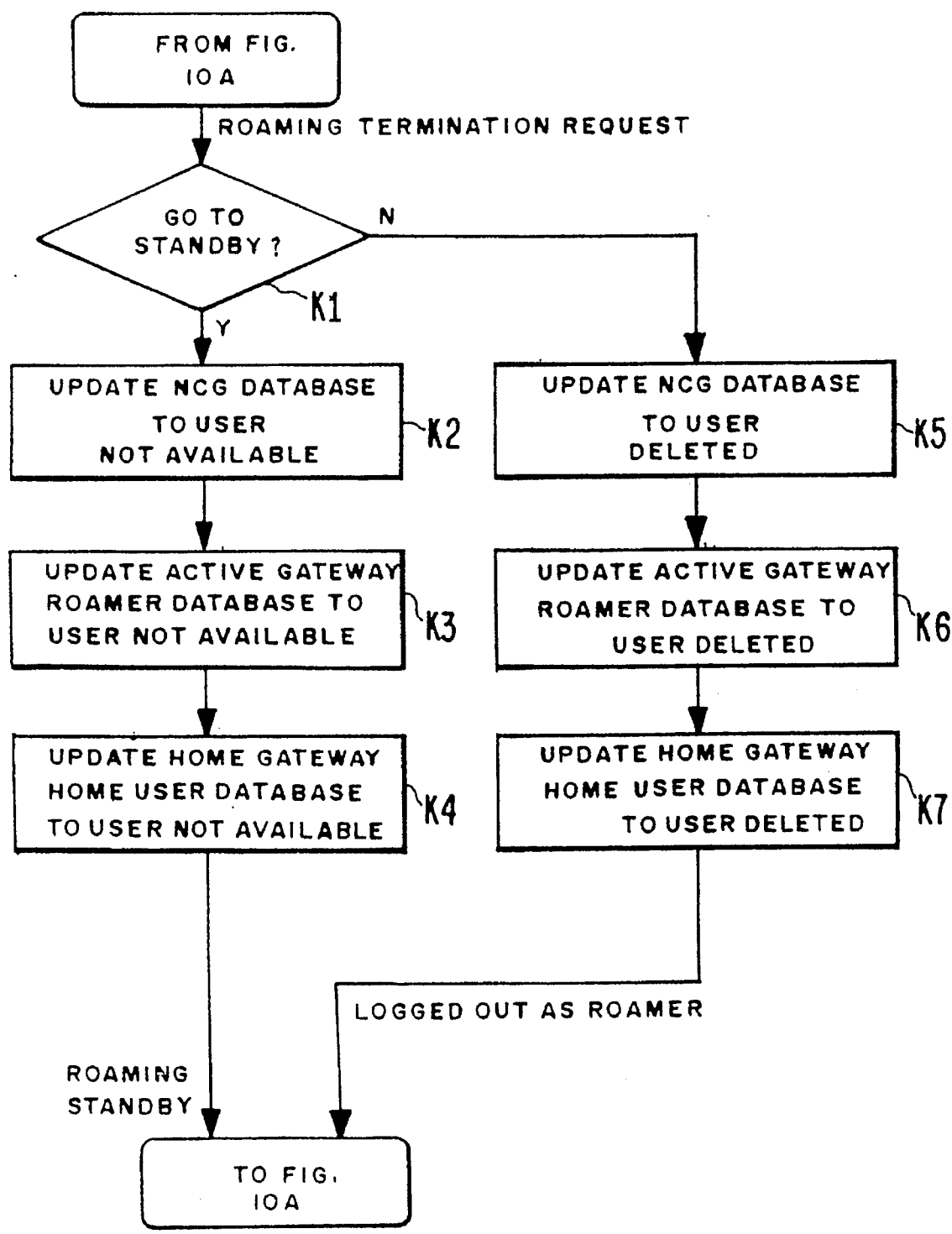

In the process of accepting calls at the AG 101, 16, the signals are received by antenna 203 and applied to the Satellite RF Unit 238 as shown in FIG. 6. The signals are processed, applied to modem 237, thence to decoder 234 and the CTIU 230. The CTIU 230 sends the user ID and Call Destination to the gateway controller 260. The gateway controller 260 checks the information being fed to it by the NCG 28 to see if there are satellite 22 resources, and if there are resources, the channels that are available. If no satellite resources are available, the gateway controller 260 sends a message to CTIU 230 to signal the user 30 to retry (method described below). If satellite 22 resources are available, the user ID is checked against the stored ID information held in the database for acceptability of the user 30 (FIG. 10D, D3). If no access is detected, the call request is terminated (FIG. 10C, C2; FIG. 10D, D5). If access is allowed (D5), the gateway controller 260 checks the availability of the gateway 12, 14, 16, 18 resources. If gateway 12, 14, 16, 18 resources are not available, the gateway controller 260 sends a request to the NCG 28 to check for other available gateways 12, 14, 16, 18. If no other gateways 12, 14, 16, 18 are available, network computer 612 sends a message to the AG 16, 101 to signal the user 30 to retry (method described below). If another gateway 12, 14, 16, 18 is available, network computer 612 selects this gateway 12, 14, 16, 18 as the new AG because the current AG 16, 101 is not available or because of a system choice. The network computer 612 sends a message to the current AG 16, 101 that a new AG 12, 14, 18 has been selected. The current AG 16, 101 removes user 30 from database 27. The network computer 612 sends user ID and user location to the new AG 12, 14, 18 and to the user's HG 12, 14, 16, 18 via the packet network 32 through landlines 132. The AG 12, 14, 18 receives the information and updates its roamer database 27 and the HG 12, 14, 16, 18 receives the information and updates its home user database 31.

INBOUND CALL SETUP PROCESS/AG ACCEPTANCE

If the current AG 16, 101 is available or a new AG 12, 14, 18 was selected, the gateway controller 260 sends the call information to the user by the same method as call setup as described in the request for SSA 24 roaming. The user 30 receives call information, sets transmit and receive frequencies, sets transmit and receive codes if CDMA is being used, and goes to stand-by. The cellular telephone interface unit 230 at the AG 16, 101 processes the call and applies the desired destination number to the cellular telephone system w/switch 221. The CTIU 230 at the AG 16, 101 generates ACK codes for the call request processor 235 and destination code signals for the cellular telephone system with its switch 221. Referring first to the ACK codes, the call request processor 235 signals the ACK generator 236 to signal the user 30 that it is ready to place the call. This ACK signal is applied to encoder 232 and modem 237, and passed to satellite RF unit(s) 238. After processing, the signal is applied to antenna 203 for transmitting to the satellite 22. Referring to FIG. 9, the ACK signal is transmitted over link "D", 34 or link "B", 36 depending on whether the gateway is the home gateway 12 or a remote gateway 14, 16, 18. The satellite 22 relays the signal over link "A", 36 to the user 30.

Referring to FIG. 5, the signal is received by the user satellite telephone 501 by its antenna 522 and applied to the user's satellite RF converter 527. The resulting signal is passed to modem 526 for demodulation then decoded by decoder 525. The signal is sent to request/ACK generator 533. The user 30 and the gateway 16, 101 now have a full duplex link for passing two-way communications traffic.

Referring now to the destination signals sent to the cellular telephone switch 221, in its normal fashion the cellular telephone system w/switch 221, as shown in FIG. 4, via the terrestrial system lines 120, 121, connects to the desired call destination 107, 108, 50 via the telephone central office 106. Once the call destination 107, 108, 50 answers the call, full duplex operation begins. The CTIU 230 at the AG 16, 101 sends a message to the NCG 28 to update database 20 to show call in progress by formatting a message and sending it to the CTS 221 which sends the message to the NCG 28. The data are received by the NCG 28 by the cellular telephone system 223 through landlines 132 which send the data to the CTIU 230. The CTIU 230 routes the message to the network computer 612 which updates network database 20 to show that the user 30 has a call in progress. The CTIU 230 at the AG 16, 101 sends the user ID along with "call in progress" to the user's HG 12, 14, 16, 18, 101 via the packet network 32 through landlines 131. The data are received by the HG 12, 14, 16, 18, 101 by the cellular telephone system 221 through landlines 130. The cellular telephone system 221 updates the home user database 31 to show the user 30 as having a call in progress. The Handoff Processor 250 at the AG 16, 101 is updated with the information regarding this duplex call.

INBOUND CALL ACCEPTANCE RETRY NOTICE (CALL NOT ACCEPTED)

If the call is not accepted (FIG. 10C, Steps C1, C2), the gateway controller 260 generates codes indicating NOT OK—RETRY, formats a signal to the user 30 to show that the call must be retried, and formats a message and sends it to the CTIU 230, which passes the data to encoder 232. The encoded signal is applied to modem 237 for modulation, applied to Satellite RF Unit 238 and, after processing there, applied to antenna 203 for transmitting to the satellite 22. Referring to FIG. 9, the NOT OK—RETRY signal is transmitted over link "D", 34 or link "B", 36 depending on whether the gateway is the home gateway 12 or a remote gateway 14, 16, 18. The satellite 22 relays the signal over link "A", 36 to the user 30.

Referring to FIG. 5, the retry signal is received by the user's satellite antenna 522 and passed to the user's Satellite RF Unit 527. The resulting datastream is demodulated by modem 526 and passed to decoder 525. The decoded retry signal is applied to Retry Generator 534. When, after a prescribed time delay, the comparator in Retry Generator 534 shows positive, it signals the call request generator 533 to retry. A counter limits the number of retries.

INBOUND CALL DUPLEX PROCESS

Reference is made to FIGS. 4 and 9 for signal routing and satellite operation, to FIG. 5 for user equipment operation, and to FIG. 6 for gateway operation.

USER TO CALL DESTINATION DIRECTION

Referring to FIG. 5 to consider the user's end of a duplex call, user 30 communicates to the call destination 107, 108, 50 by activating Cellular Telephone 503 which passes digital voice or data to encoder 524, which encodes the signal into a datastream, which is passed to modem 526. Modem 526 modulates the signal and passes it to Satellite RF Converter 527 for transmission to the satellite 22 by the antenna 522.

This signal from user 30 is transmitted via link "A", 34 in FIG. 9 to satellite 22. The signal is received by the communications uplink RF receiver 302, then applied to the SCT 306, which translates the frequency of the signal, and applies it to the communications downlink RF transmitter 303, which amplifies and transmits the signal to the ground by an antenna. The satellite 22 transmits the signal via link "B" 36, or "D" 36, depending on the gateway 12, 14, 16, 18 selected in the call setup process.

Referring to FIG. 6, the signals are received by the MSA/RSA equipment 101 by antenna 203 and applied to the satellite RF unit(s) 238. After processing, the signal is applied to modem 237 and thence to decoder 234 if necessary. (If the user equipment generates data that conform to industry standards, the decoding step may be bypassed.) After decoding, the signal is applied to the cellular telephone interface unit 230 and thence to the Cellular Telephone System w/switch 221. The system then applies the signal to the terrestrial interface 120 via the telephone central office 106 and thence to the call destination device 107, 108, 50 (FIGS. 2 and 4).

CALL DESTINATION 107, 108, 50 TO USER 30 DIRECTION

In a similar manner, the signals from the call destination 107, 108, 50 are processed. Referring to FIGS. 2 and 4, the call destination user 107, 108, 50 activates his Telephone Device 107, 108 which passes his voice or data over landlines 123, 124 to the Telephone Central Office (TCO) 106. According to the invention, these signals are routed to the selected Terrestrial Cellular Telephone System 101, 102 by landlines 120, 121. The landline system is not bypassed. Referring to FIG. 6, the exemplary Cellular Telephone System 221 routes the signals to the Cellular Telephone Interface Unit 230 where the signals are processed and fed to encoder 232. After encoding, the signals are applied to modem 237 for modulation and sent to the Satellite RF Unit 238. The resulting RF signal is sent to the antenna 203 for transmission to the Satellite 301, 302, 22.

This signal from the gateway 12, 14, 16, 18 is transmitted to satellite 22 via link "B" 36, or "D" 34 (FIG. 9), depending on the gateway selected in the call setup process. The signal is received by the communications uplink RF receiver 302, which applies the signal to the SCT 306, which translates the frequency of the signal and applies the signal to the communications downlink RF transmitter 303, which amplifies and transmits the signal to the ground by an antenna. The satellite 22 transmits the signal via link "A", 36 to the user 30.

Referring to FIG. 5, the user 30 receives communications in the following manner: the signals are received by the antenna 522 and sent to Satellite RF converter 527, then passed to modem 526. The demodulated baseband signals are then decoded by decoder 525 and sent to the cellular telephone 503 for further processing into audio or data.

HANDOFF OF INBOUND AND OUTBOUND CALLS

The handoff of both inbound and outbound calls is accomplished by similar means. The handoff processor 33 senses user signal level below a preset level over a prescribed length of time or a handoff is required given the satellites 22 in view of the AG 16. Subsequent handoffs are accomplished in the same manner, with the second satellite 22 taking the place of the original satellite 22 and a third satellite taking the place of the new satellite 22, and so on.

The handoff processor 33 signals modem 237 to search the other satellites 22 in view for the user 30. If the user 30 is not found on the other satellites 22, the handoff processor 33 is reset and after a prescribed length of time the signal level will be checked to see if the hand-off procedure should start again. If the user 30 is found on another satellite 22, the handoff processor 33 checks the input from the RF power monitor 251 if channel capacity is acceptable. If not acceptable, the handoff processor 33 picks an acceptable channel frequency and new CMDA codes if required. The handoff processor 33 formats a message containing the new transmit and receive frequencies (and new codes if required) and sends the message to modem 237 for modulation. Modem 237 modulates the message and applies the signal to the Satellite RF Unit 238. The resulting RF signal is sent to the antenna 203 for transmission to the original Satellite 301, 302, 22.

Referring to FIG. 9, the signals are transmitted from the gateway 12, 14, 16, 18 over link "D", 34 or link "B", 36 depending on the gateway selected during the call setup process. The signals are downlinked to the user 30 via link "A", 36.

Referring to FIG. 5, the user 30 receives communications in the following manner: the signals are received by the antenna 522 and sent to Satellite RF converter 527, then passed to modem 526. The demodulated baseband signals are then decoded by decoder 525. The resulting signal is sent to request/ACK generator 533 which shifts the cellular telephone 503 to the proper channel and provides modem 526 with the call CDMA codes for reception and goes to ready. The request/ACK generator 533 sends an ACK to handoff processor 33 at the AG 16 through the satellite 22. The handoff processor 33 receives the ACK and shifts satellite RF unit 238 to new transmit and receive frequencies. Handoff processor 33 signals the satellite RF unit 238 to send its transmissions and receptions to the new satellite 22 and the call continues.

If there was adequate channel capacity on the new satellite 22 at the original frequencies, handoff processor 33 signals the satellite RF unit 238 to send its transmissions and receptions to the new satellite 22 and the call continues. The handoff processor 33 formats a message for the NCG 28 regarding the new satellite 22 and new frequency assignment if required, and sends the message to the packet network 32 through landlines 130. The data are received by the NCG 28 by the CTIU 230 through landlines 132. The CTIU 230 routes the message to network computer 612 which updates network database 20 to show the new call information.

CALL TERMINATION OF INBOUND AND OUTBOUND CALLS

Calls are terminated in the same manner for user 30 initiated calls or caller 107, 108, 50 generated calls (FIG. 10C to FIG. 10F or FIG. 10G to FIG. 10J) as follows: Referring to FIG. 6, the Cellular Telephone System 221 senses an on-hook condition, from either the user 30 or the call destination 107, 108, 50, and signals the Cellular Telephone Interface Unit (CTIU) 230 to activate call termination. The CTIU 230 signals the call termination processor 233 to generate a call termination signal and route it to the encoder 232. The encoded signal is then applied to modem 237 for modulation, and this modulated signal is routed to the Satellite RF Unit 238. The resulting RF signal is sent to antenna 203 for transmission to the Satellite 301, 302, 22.

This signal from the gateway 12, 14, 16, 18 is transmitted via link "B" 36, or "D" 34 (FIG. 9), depending on the gateway selected in the call setup process, to the satellite 22. The signal is received by the communications uplink RF receiver 302, which applies the signal to the SCT 306, which translates the frequency of the signal and applies it to the communications downlink RF transmitter 303, which amplifies and transmits the signal to the ground by an antenna. The satellite 22 transmits the signal via link "A", 36 to the user 30.

Referring to FIG. 5, the user 30 receives communications in the following manner: the signal is received by the antenna 522 and sent to the Satellite RF converter 527, then passed to modem 526 for demodulation. The demodulated baseband signals are then decoded by decoder 525 and sent to the cellular telephone 503, which discontinues the call.

The Cellular Telephone System 101, 102 also activates codes which are transmitted over landlines 130 to the NCG 28. Referring to FIG. 4, these signals are routed over the network landlines 130, 131 to the TCO 106 and thence to the NCG 28 by landline 132. Referring to FIG. 7, these signals are processed by network computer 612, which updates the network database 20 to show the user not busy. Certain other business data are also routed to the NCG 28, such as billing information, call time, rates, or other such information. The gate controller 260 at the AG 16 notifies the home gateway (HG) 12, 14, 16, 18, 101, 102, via packet switched network 32, through landlines 130 via telephone central office 106 or other such network, of the current status of the user. The data are received by the HG 12, 14, 16, 18, 101, 102 by the cellular telephone system 221 through landlines 130. The cellular telephone system 221 updates the home user database 31 to show the user 30 as not busy. The AG 16 resets processors and updates databases. Referring to FIG. 6, the cellular telephone system w/switch 221 then updates the roamer database 27 to show the user not busy.

CALL INITIATION BY A CALLER 107, 108, 50 (AN OUTBOUND CALL)

Referring to FIG. 4, the process to initiate a call from a caller 107, 108, 50 to a user 50 roaming in a service area is as follows:

CALL REQUEST (OUTBOUND)

A call request is made when a caller 107, 108, 50 makes a terrestrial PSTN or other network call to the user's home or equivalent TCTSA (gateway) 12, 14, 16, 18, 101, 102, rather than to a nearby uplink, which would bypass the normal terrestrial structure. The call is routed to the user's HG 12, 14, 16, 18, 101, 102 via the normal terrestrial structure. Referring to FIG. 4, the caller 107, 108, 50 using a telephone device 107, 108 dials the telephone number of the user equipment 501, 502 by the use of any means provided by the device 107, 108. The number is passed via the terrestrial lines or equivalent means 123, 124 to the Telephone Central Office 106 or other central switching office, and thence via terrestrial lines or equivalent means 120, 121 to the Cellular Telephone System equipment 101, 102 located at the user's home gateway 12, 14, 16, 18, 101, 102.

Referring to FIG. 6, the request for access to the user 30 is processed by the Cellular Telephone System w/switch 221, which interrogates the home user database 31 to determine if the user 30 is roaming in the SSA 24. If the user 30 is roaming in the SSA 24 and is not busy, the HG 12, 14, 16, 18, 101, 102 reacts in one of two ways: A) the HG sends an access number to the caller 107, 108, 50 for the caller to redial, which will ring at the AG 16; or B) the user number, location, active gateway (AG) 16, and other user data are retrieved from the database 31 and passed to the satellite interface equipment 201. The signal is applied to the route planner 240. The route planner processes the information, and, using stored satellite ephemeris and user information, selects the routing of the call to the AG 16. The call is routed to the AG 16 through the normal terrestrial structure.

AG 16 ACCEPTANCE OF CALLS FROM CALLER 107, 108, 50 (OUTBOUND)

The gateway controller 260 at the AG 16 receives the call through landlines 120 or by the caller using the access number which is received by the CTS 120 at the AG 16 and the CTS 120. The gateway controller 260 checks the information being fed to it by the RF Power Monitor 251 and from the NCG 28 to see if there are satellite 22 resources, and if there are resources, the channels that are available.

If no satellite 22 resources are available, the gateway controller 260 formats a message to signal caller 107, 108, 50 that the system 10 is busy and to retry, and sends the message to CTS 221. The cellular telephone system 221 at the AG 16 receives the message and signals the caller 107, 108, 50 that the system 10 is busy and to retry.

If satellite 22 resources are available, the gateway controller 260 checks the availability of resources at the AG 16. If resources at the AG 16 are not available, the gateway controller 260 sends a request to the NCG 28 to check for other gateways 12, 14, 16, 18. If no other gateways are available, the network computer 612 formats a message to signal caller 107, 108, 50 that the system 10 is busy and to retry, and sends the message to CTIU 230. The CTIU 230 sends the message to the AG 101, 102, 16 via the packet network 32 through landlines 132. The cellular telephone system 221 at the HG 12, 14, 16, 18, 101, 102 receives the message through landlines 130 and signals the caller 107, 108, 50 that the system 10 is busy and to retry. If another gateway 12, 14, 16, 18 is available, the network computer 612 selects this gateway 12, 14, 16, 18 as the new AG, because the current AG 16 is not available, or because of a system choice. The network computer 612 sends a message to the current AG 16, 101 that a new AG 12, 14, 18 has been selected. The current AG 16, 101 removes user 30 from database 27. The network computer 612 sends user ID and user location to the new AG 12, 14, 18, and to the user's HG 12, 14, 16, 18, 101, 102 via the packet network 32 through landlines 132. The AG 16 receives the information and updates its roamer database 27 and the HG 12, 14, 16, 18, 101, 102 receives the information and updates its home user database 31.

The gateway controller 260 at the AG 12, 14, 16, 18 formats a hailing message for the user 30 and sends the message to the CTIU 230, which routes the message to the encoder 232. The message is processed by modem 237 and satellite RF unit 238, and transmitted to the satellite 22 through antenna 205. The satellite 22 relays the message to the user 30. If no response, the AG 12, 14, 16, 18 checks all satellites 22 in view. If user 30 is not found after a prescribed length of time, the gateway controller 260 formats a message for the caller 107, 108, 50 that the user 30 is not available, and sends the message to the CTS 221. The cellular telephone system 221 at the AG 12, 14, 16, 18 signals the caller 107, 108, 50 that the user 30 is not available at this time. If the user 30 receives the hailing message, referring to FIG. 5, the user 30 receives communications in the following manner: The signals are received by the antenna 522 and sent to the Satellite RF converter 527, then passed to modem 526 for demodulation. The demodulated baseband signals are then decoded by 525. The resulting signal is sent to request/ACK generator 533, which formats an ACK message and sends the ACK to encoder 524. After encoding, the ACK is passed to modem 526. Modem 526 modulates the signal and passes it to the Satellite RF Converter 527 for transmission to the satellite 22 by the antenna 522.

Referring to FIG. 9, the uplink signal is transmitted to the satellite 22 from the user 30 over link "A", 34 and relayed to the AG 12, 14, 16, 18. The signals are downlinked via link "D" 36 or "B" 36, depending upon whether the AG 12, 14, 16, 18 is the user's home gateway or the user 30 is roaming.

Referring to FIG. 6, the signals are received by the gateway equipment 101 by antenna 203 and applied to the satellite RF unit(s) 238. After processing, the signal is applied to modem 237 and thence to decoder 234 if necessary. (If the user equipment generates data that conforms to industry standards, the decoding step may be bypassed.) After decoding, the signal is applied to the CTIU 230, which recognizes the ACK and sends the ACK to the gateway controller 260.

OUTBOUND CALL SETUP, AG 16 ACCEPTANCE

If the current AG 16 is available or a new AG 12, 14, 18 was selected, the gateway controller 260 sends the identity of the current satellite 22 being used, transmit and receive frequencies, and transmit and receive codes if CDMA is being used to the user 30 by the same method as call setup as described in the request for SSA 24 roaming. The user 30 receives call information, sets transmit and receive frequencies, sets transmit and receive codes if CDMA is being used, and goes to stand-by.

The AG 12, 14, 16, 18 signals the user 30 on assigned frequency and codes if required. The CTIU 230 at the AG 12, 14, 16, 18 generates ACK codes for the call request processor 235. The call request processor 235 signals the ACK generator 236 to signal the user 30 that the user 30 is being called. This ACK signal is applied to the encoder 232 and the modem 237 and passed to the satellite RF unit(s) 238, and after processing, applied to the antenna 203 for transmitting to the satellite 22. Referring to FIG. 9, the ACK signal is transmitted over link "D", 34 or link "B", 36 depending on whether the gateway is the home gateway 12 or a remote gateway 14, 16, 18. The satellite 22 receives the signal and relays the signal over link "A", 36 to the user 30.

Referring to FIG. 5, for reception and processing of outbound calls at the user 30, the user's antenna 522 receives the signal and routes it to the Satellite RF converter 527, which routes the signal to modem 526. The resulting datastream is applied to decoder 525. After decoding, the data are sent to the request/ACK generator 533. Codes are generated and sent to the Cellular Telephone 503 to ring the user 30. The Cellular Telephone 503 signals the ACK generator 533 to send signaling codes to the AG 12, 14, 16, 18 via the encoder 524. The ACK signal is passed from the encoder 524 to the modem 526 and thence to the Satellite RF converter 527. The resulting ACK signal is transmitted to the Satellite 301, 302, 22 via the antenna 522. The user wireless satellite telephone 501 then shifts frequency to the channel selected by the AG 12, 14, 16, 18, and loads, if necessary, the CDMA code for the call into the modem 526. The user then waits for duplex operation to begin.

The ACK signal is received by satellite 301, 302, 22 and transmitted to the earth. The signal is received at the gateway equipment 101, 102 by antenna 203, 204 and applied to the satellite RF unit(s) 238. After down conversion to baseband, the signals are demodulated by the modem 237 and routed to the decoder 234. The decoded baseband signals are then applied to the cellular telephone interface unit 230. The cellular telephone interface unit 230 processes the information.

The cellular telephone interface unit 230 then applies the voice and data signal stream to the encoder 232 or directly to the modem 237, depending on the incoming signal structure, and thence to the assigned channel of the satellite RF unit(s) 238, thence to the antenna 203, 204. Duplex operation can now begin. The CTIU 230 at the AG 12, 14, 16, 18 sends a message to the NCG 28 to update database 20 to show call in progress, by formatting a message and sending it to the CTS 221, which sends the message to the NCG 28. The data are received by the NCG 28 by the cellular telephone system 223 through landlines 132, which send the data to the CTIU 230. The CTIU routes the message to the network computer 612, which updates the network database 20 to show that the user 30 has a call in progress. The cellular telephone system 221 updates the home user database 31 to show the user as roaming, the user's location, and the AG 12, 14, 16, 18. The AG 12, 14, 16, 18 sends the user ID along with call in progress to the user's HG 101, 102, 12, 14, 16, 18 via the packet network 32 through landlines 132. The data are received by the HG 101, 102, 12, 14, 16, 18 by the cellular telephone system 221 through landlines 130. The cellular telephone system 221 updates the home user database 31 to show the user 30 as having a call in progress. The Handoff Processor 33 at the AG 12, 14, 16, 18 is updated with the information regarding this duplex call.

OUTBOUND CALL DUPLEX PROCESS

The outbound call duplex process is identical to that of a user 30 initiated call described above.

HANDOFF OF OUTBOUND CALLS

The handoff processes are identical to that of a user 30 initiated call described above.

CALL TERMINATION (OUTBOUND CALL)

The call termination processes are identical to that of a user 30 initiated call described above.

NOTIFICATION TO DISCONTINUE ROAMING BY USER 30

As in the notification to the system 10 of the intent to commence roaming, there are two methods by which the user 30 can notify his intent to discontinue roaming. The user 30 has two options: he may notify Network Control (NC) 25 of his intention while in the SSA 24 and out of range of a TCTSA 12, 14, 16, 18 and have his request processed via a satellite 22 relay to the AG 16, or he may make his request via a participating TCTSA 12, 14, 16, 18. These two cases are now explained (See FIGS. 10A, 10K, 10L.)

REQUEST TO DISCONTINUE ROAMING BY USER 30 IN SSA 24

The user 30 notifies the system 10 byway of the satellite 22 that he desires to be deleted from the Database of Roamers 27 in the SSA 24. Referring to FIG. 5, the user 30 initiates a termination request by manually or automatically activating the User Request Unit 535. A signal is passed to the Request/ACK Generator 533. This generates a termination request, which is passed to the encoder 524 and modulated by modem 526. The resulting signal is routed to the Satellite RF Converter 527 and then to the antenna 522 for transmission to the satellite 22. The signal is transmitted to the satellite(s) 22 in view via link "A" and the satellite(s) 22 transmit the signal to the AG 16 via link "B".

Referring to FIG. 6, the downlink signal is received at the AG 16 satellite antenna 203 and applied to the Satellite RF Unit(s) 238. The resulting baseband signal is demodulated in modem 237, sent to decoder 234, and thence to the CTIU 230. The resulting data are sent to the gateway controller 260, which instructs the database 20 to delete the user' 30 from the list of SSA Roaming Users 27. The gateway controller 260 sends the termination request to the NCG 28 by formatting a message which contains the request and user ID and routes the data to the packet switch network 32 through landlines 132. The data are received by the NCG 28 through landlines 132. The NCG 28 then deletes the user 30 from the roamer database 27.

The gateway controller 260 at the AG 16 sends the user ID and termination request to the user's HG (e.g. 101) via the packet network 32 through landlines 132. The data are received by the HG 101 by the cellular telephone system 221 through landlines 130. The cellular telephone system 221 updates the home user database 31 to show the user 30 as not roaming in the SSA 24.

REQUEST TO DISCONTINUE ROAMING BY USER 30 IN A TCTSA 12, 14, 16, 18

Figure 10L:
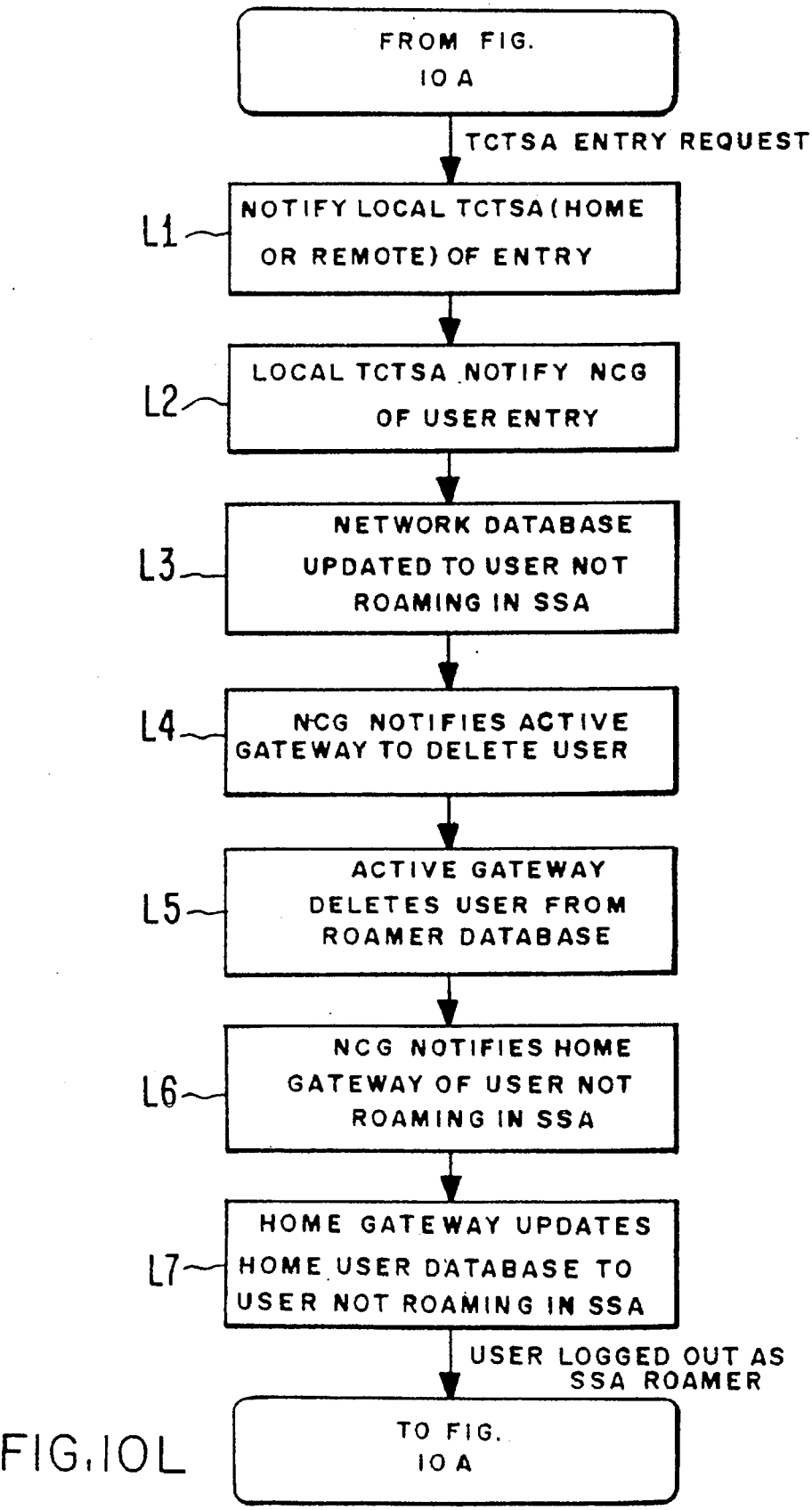

Referring to FIG. 1 and FIG. 10L, the user 30 re-enters a remote TCTSA (e.g. 12) or his home TCTSA (e.g. 14) and either automatically or manually notifies the system 10 by way of the TCTSA 12, 14 that he desires to be deleted from the network database 20 of active users in the SSA 24. Referring to FIG. 5, the user equipment 501 initiates a termination request by manually or automatically activating the User Request Unit 535. A signal is passed to the Request/ACK Generator 533. This generates a termination request, which is passed to the Cellular Telephone 503. The resulting signal is routed to the antenna 505 for transmission to the TCTSA 12, 14. The signal is received by the TCTSA 12, 14 and relayed to the NCG 28 via the packet network 32 through landlines 130, 131.

Referring to FIG. 7, the signal is received via landline 132 at the NCG 28, which instructs the network database 20 to delete the user 30 from the list of SSA Roaming Users. The network computer 612 sends the termination request to the AG 16 by formatting a message which contains the request and user ID, and sending it to the cellular telephone interface unit (CTIU) 230, which routes the data to the cellular telephone system 223 and to the packet switch network 32 through landlines 132. The data are received by the AG 16 by the cellular telephone system 222 through landlines 131. The cellular telephone system 222 then deletes the user 30 from the roamer database 27.

The network computer 612 sends the user ID and termination request to the user's HG (e.g. 101) via the packet network 32 through landlines 132. The data are received by the HG 101 by the cellular telephone system 221 through landlines 130. The cellular telephone system 221 updates the home user database 31 to show the user 30 as not roaming in the SSA 24.

The invention has now been explained with reference to specific embodiments. Other embodiments will be apparent to those of ordinary skill in this art in light of this disclosure. It is therefore not intended that this invention be limited, except as indicated by the appended claims.

What is claimed is:

1. A method for performing wireless communications in a satellite communications system that is bidirectionally coupled to a terrestrial communications network, comprising the steps of:

providing a plurality of earth orbiting satellites;

initiating a request for service with a wireless transceiver of a group of wireless transceivers associated with users of the satellite communications system, individual ones of the group of wireless transceivers being bidirectionally coupled, when active, through first RF links to at least one satellite of the plurality of earth orbiting satellites for transmitting communications signals to, and for receiving communications signals from, the at least one satellite;

transmitting the request for service from the wireless transceiver over one of the first RF links to the at least one satellite;

repeating the request for service by receiving the request for service with the at least one satellite from the one of the first RF links, frequency shifting the received request for service, and transmitting the frequency shifted request for service to one of second RF links, without regard for any informational content of the request for service;

receiving the repeated request for service with at least one network coordinating gateway, the at least one network coordinating gateway being bidirectionally coupled to the at least one satellite through the second RF links;

providing a plurality of terrestrial gateways that are bidirectionally coupled through the second RF links to the at least one satellite for transmitting communications signals to, and for receiving communications signals from, the at least one satellite, each of the plurality of terrestrial gateways also being bidirectionally coupled to a terrestrial communications network;

determining, with the network coordinating gateway, a location of the wireless transceiver that is requesting service;

selecting, with the network coordinating gateway, one of the plurality of terrestrial gateways to couple the wireless transceiver requesting service to the terrestrial communications network, the terrestrial gateway being selected in accordance with at least the determined location of the wireless transceiver that is requesting service;

establishing a wireless communication link between the wireless transceiver requesting service and the terrestrial communications network through the selected one of the terrestrial gateways; and in response to the selected one of the terrestrial gateways establishing the wireless communication link between the wireless transceiver requesting service and the terrestrial communications network, the established wireless communication link having a first uplink communications signal component from the wireless transceiver to the at least one satellite, a first downlink communications signal component from the at least one satellite to the selected terrestrial gateway, a second uplink communications signal component from the terrestrial gateway to the at least one satellite, and a second downlink communications signal component from the at least one satellite to the wireless transceiver, repeating the first uplink communications signals with the at least one satellite by receiving the first uplink communications signals, frequency shifting the received first uplink communications signals, and transmitting the frequency shifted first uplink communications signals as the first downlink communications signals, without regard for any informational content of the first uplink communications signals; and repeating the second uplink communications signals with the at least one satellite by receiving the second uplink communications signals, frequency shifting the received second uplink communications signals, and transmitting the frequency shifted second uplink communications signals as the second downlink communications signals, without regard for any informational content of the second uplink communications signals; wherein the step of repeating the request for service, the step of repeating the first uplink communications signals, and the step of repeating the second uplink communications signals all repeat code division multiple access signals; and wherein the step of establishing the wireless communication link includes a step of transmitting at least one code to the wireless transceiver requesting service, the at least one code being used for at least one of (a) modulating a communication signal that is transmitted from the wireless transceiver using the first uplink communications signal component, and (b) demodulating a communication signal that is transmitted to the wireless transceiver using the second downlink communications signal component.

2. A method as set forth in claim 1, and further comprising a step of maintaining a satellite communications system database that is bidirectionally coupled to the least one network coordinating gateway, the step of maintaining including a step of storing information in the satellite communications system database for identifying at least (a) active wireless transceivers, (b) a physical location of the active wireless transceivers, and (c) a home terrestrial gateway of the active wireless transceivers.

3. A method as set forth in claim 1, and further comprising a step of transferring the established wireless communication link from a first .satellite to a second satellite.

4. A method as set forth in claim 1 wherein each of the plurality of terrestrial gateways is associated with a service coverage area, and further comprising the terrestrial gateway executed steps of:

maintaining a database that records information descriptive of home wireless transceivers; and maintaining a database that records information descriptive of active wireless transceivers that are located within the service coverage area that is associated with the terrestrial gateway; wherein the selected terrestrial gateway is responsive to a condition that an identification of a wireless transceiver requesting service is not found in the database of home transceivers, for updating the database of active wireless transceivers to include an identification of the wireless transceiver requesting service.

5. A method as set forth in claim 1, and further comprising the steps of:

initiating, with a transceiver that is coupled to the terrestrial communications network, a request to establish a communications link with a specified one of the plurality of wireless transceivers;

routing the request through the terrestrial communications network to a home user database to determine a current location of the specified one of the plurality of wireless transceivers;

further routing the request through the terrestrial communications network to a terrestrial gateway having a service coverage area that includes the location of the specified one of the plurality of wireless transceivers;

determining in the terrestrial gateway if satellite and terrestrial gateway resources are available to establish the communications link; and if it is determined that the resources are available, establishing the communications link from the transceiver coupled to the terrestrial communications network, through the terrestrial gateway, and through at least one satellite to the specified one of the plurality of wireless terminals.

6. A satellite communications system that is bidirectionally coupled to a terrestrial communications network, comprising:

a plurality of earth orbiting satellites;

at least one wireless transceiver associated with a user of the satellite communications system, said wireless transceiver comprising first means for bidirectionally coupling said wireless transceiver, when active, through first RF links to at least one satellite of the plurality of earth orbiting satellites for transmitting communications signals to, and for receiving communications signals from, the at least one satellite, said first means for bidirectionally coupling being response to input from the user for transmitting a request for service from the wireless transceiver over one of the first RF links to the at least one satellite, said wireless transceiver further comprising second means for bidirectionally coupling said wireless transceiver, when active, through other RF links to a terrestrial cellular communications system for transmitting communications signals to, and for receiving communications signals from, the terrestrial cellular communications system;

said at least one satellite comprising means for repeating the request for service by receiving the request for service from the one of the first RF links, for frequency shifting the received request for service, and for transmitting the frequency shifted request for service to one of second RF links, without regard for any informational content of the request for service;

a plurality of terrestrial gateways that are bidirectionally coupled through the second RF links to the at least one satellite for transmitting communications signals to, and for receiving communications signals from, the at least one satellite, each of the plurality of terrestrial gateways also being bidirectionally coupled to a terrestrial communications network; and a network coordinating gateway comprising means for receiving the request for service from the one of the second RF links, said network coordinating gateway further comprising means for determining a location of the wireless transceiver that is requesting service and for selecting one of the plurality of terrestrial gateways to couple the wireless transceiver requesting service to the terrestrial communications network, the terrestrial gateway being selected in accordance with at least the determined location of the wireless transceiver that is requesting service; wherein each of said terrestrial gateways further comprises means for establishing a wireless communication link between the wireless transceiver requesting service and the terrestrial communications network, the established wireless communication link having a first uplink communications signal component from the wireless transceiver to the at least one satellite, a first downlink communications signal component from the at least one satellite to the selected terrestrial gateway, a second uplink communications signal component from the terrestrial gateway to the at least one satellite, and a second downlink communications signal component from the at least one satellite to the wireless transceiver; and wherein said repeating means of said at least one satellite repeats the first uplink communications signals by receiving the first uplink communications signals, frequency shifting the received first uplink communications signals, and transmitting the frequency shifted first uplink communications signals as the first downlink communications signals, without regard for any informational content of the first uplink communications signals, and also repeats the second uplink communications signals by receiving the second uplink communications signals, frequency shifting the received second uplink communications signals, and transmitting the frequency shifted second uplink communications signals as the second downlink communications signals, without regard for any informational content of the second uplink communications signals.

7. A satellite communications system as set forth in claim 6, wherein individual ones of said terrestrial gateways are bidirectionally coupled to said terrestrial communications network though a cellular telephone interface unit.

8. A satellite communications system as set forth in claim 6, wherein individual ones of said terrestrial gateways further comprise a handoff processor for handing off an established wireless communications link from a first satellite to a second satellite.

9. A satellite communications system as set forth in claim 6, wherein said network coordinating gateway is bidirectionally coupled to said terrestrial communications network though a cellular telephone interface unit.

10. A satellite communications system as set forth in claim 6, wherein said network coordinating gateway is colocated with one of said plurality of terrestrial gateways.

11. A satellite communications system as set forth in claim 6, wherein said network coordinating gateway is coupled to said terrestrial gateways for receiving at least terrestrial gateway status signals and user roaming requests from said terrestrial gateways.

12. A satellite communications system as set forth in claim 6, wherein said network coordinating gateway is coupled to said terrestrial gateways for transmitting at least call setup information to said terrestrial gateways.

13. A satellite communications system as set forth in claim 6, wherein said plurality of satellites are a constellation of low earth orbit satellites.

14. A satellite communications system that is bidirectionally coupled to a terrestrial communications network, comprising:

a plurality of earth orbiting satellites;

a plurality of wireless transceivers associated with users of the satellite communications system, each of said wireless transceivers comprising first means for bidirectionally coupling said wireless transceiver, when active, through a first RF link to at least one satellite of the plurality of earth orbiting satellites for transmitting communications signals to, and for receiving communications signals from, the at least one satellite, said first means for bidirectionally coupling being response to input from the user for transmitting a request for service from the wireless transceiver over said first RF link to the at least one satellite;

said at least one satellite comprising means for repeating the request for service by receiving the request for service from the one of the first RF links, for frequency shifting the received request for service, and for transmitting the frequency shifted request for service to a second RF link, without regard for any informational content of the request for service; and a plurality of gateways that are bidirectionally coupled through the second RF link to the at least one satellite for transmitting communications signals to, and for receiving communications signals from, the at least one satellite, each of the plurality of gateways also being bidirectionally coupled to a terrestrial communications network, at least one of said gateways functioning as a network coordinating gateway and comprising means for receiving requests for service from the second RF link, said network coordinating gateway further comprising means for determining a location of the wireless transceiver that is requesting service and for selecting one of the plurality of gateways to couple the wireless transceiver requesting service to the terrestrial communications network, the gateway being selected in accordance with at least the determined location of the wireless transceiver that is requesting service.

15. A satellite communications system as set forth in claim 14, wherein each of said gateways further comprises means for establishing a wireless communication link between the wireless transceiver requesting service and the terrestrial communications network, the established wireless communication link having a first uplink communications signal component from the wireless transceiver to the at least one satellite, a first downlink communications signal component from the at least one satellite to the selected gateway, a second uplink communications signal component from the selected gateway to the at least one satellite, and a second downlink communications signal component from the at least one satellite to the wireless transceiver; and wherein said repeating means of said at least one satellite repeats the first uplink communications signals by receiving the first uplink communications signals, frequency shifting the received first uplink communications signals, and transmitting the frequency shifted first uplink communications signals as the first downlink communications signals, without regard for any informational content of the first uplink communications signals, and also repeats the second uplink communications signals by receiving the second uplink communications signals, frequency shifting the received second uplink communications signals, and transmitting the frequency shifted second uplink communications signals as the second downlink communications signals, without regard for any informational content of the second uplink communications signals.

16. A satellite communications system as set forth in claim 14, wherein said plurality of wireless transceivers further comprise second means for bidirectionally coupling said wireless transceiver, when active, through other RF links to a terrestrial cellular communications system for transmitting communications signals to, and for receiving communications signals from, the terrestrial cellular communications system.

17. A satellite communications system as set forth in claim 14, wherein individual ones of said gateways are bidirectionally coupled to said terrestrial communications network though a cellular telephone interface unit.

18. A satellite communications system as set forth in claim 14, wherein individual ones of said gateways further comprise a handoff processor for handing off an established wireless communications link from a first satellite to a second satellite.

19. A satellite communications system as set forth in claim 14, wherein said network coordinating gateway is bidirectionally coupled to said terrestrial communications network though a cellular telephone interface unit.

20. A satellite communications system as set forth in claim 14, wherein said network coordinating gateway is bidirectionally coupled to said gateways for receiving at least terrestrial gateway status signals and user roaming requests from said gateways, and for transmitting at least call setup information to said gateways.

* * * * *